(12) United States Patent
Harima et al.

(10) Patent No.: US 7,302,506 B2
(45) Date of Patent: *Nov. 27, 2007

(54) STORAGE SYSTEM

(75) Inventors: Toru Harima, Odawara (JP); Tatsuo Namba, Fujisawa (JP); Katsuhiro Uchiumi, Fujisawa (JP); Naoki Futawatari, Yokohama (JP); Itaru Isobe, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/698,928

(22) Filed: Jan. 29, 2007

(65) Prior Publication Data

US 2007/0124520 A1    May 31, 2007

Related U.S. Application Data

(63) Continuation of application No. 11/076,208, filed on Mar. 10, 2005, now Pat. No. 7,188,201.

(30) Foreign Application Priority Data

Dec. 22, 2004  (JP) ............................. 2004-370887

(51) Int. Cl.
   *G06F 13/00*    (2006.01)
   *G06F 15/177*   (2006.01)
   *G06F 13/40*    (2006.01)
   *G06F 15/173*   (2006.01)
   *G06F 11/00*    (2006.01)

(52) U.S. Cl. .................... 710/104; 709/222; 709/242; 714/1; 714/43

(58) Field of Classification Search .................. None
See application file for complete search history.

(56) References Cited

U.S. PATENT DOCUMENTS 6,542,961 B1 * 4/2003 Matsunami et al. ........ 711/114

(Continued)

FOREIGN PATENT DOCUMENTS

JP    2002-063063    6/2001

OTHER PUBLICATIONS

European Search Report dated Feb. 24, 2006.

*Primary Examiner*—Paul R Myers
*Assistant Examiner*—Ryan M Stiglic
(74) *Attorney, Agent, or Firm*—Reed Smith LLP; Stanley P. Fisher, Esq.; Juan Carlos A. Marquez, Esq.

(57) ABSTRACT

The present invention unitarily manages the configuration change of a storage system so as to know the latest configuration, and evaluates the reliability in advance when the configuration is changed so that the generation of a failure is suppressed. When the host 1 is connected to the switch 2, the attribute information of HBA 1A and the attribute information of the switch 2 are stored in the connection information storage unit 2C by FDMI (Fabric Device Management Interface) (S1, S2). Each attribute information is associated with each other and is managed as combination information. The storage device 3 acquires the combination information from the switch 2 (S3, S4), and requests the management device 4 to judge the reliability of this combination (S5). The management device 4 judges the combination of the HBA and the switch (S6), and notifies this judgment result to the storage device 3 (S7). When the configuration of the storage system is changed, the reliability of the configuration can be confirmed before starting operation with the configuration after change, and therefore the generation of a failure can be decreased.

19 Claims, 17 Drawing Sheets

U.S. PATENT DOCUMENTS

| | | |
|---|---|---|
| 6,557,025 B1 | 4/2003 | Hattori et al. |
| 6,606,690 B2 | 8/2003 | Padovano |
| 6,775,230 B1 * | 8/2004 | Watanabe et al. ............ 370/228 |
| 6,851,029 B2 | 2/2005 | Matsunami et al. |
| 6,886,054 B2 | 4/2005 | Taninaka et al. |
| 6,910,102 B2 | 6/2005 | Matsunami et al. |
| 7,020,089 B2 | 3/2006 | Matsuda |
| 7,103,653 B2 | 9/2006 | Iwatani |
| 7,188,201 B2 * | 3/2007 | Harima et al. ............... 710/104 |
| 2001/0054093 A1 | 12/2001 | Iwatani |
| 2003/0061331 A1 * | 3/2003 | Nakamura et al. .......... 709/223 |
| 2003/0093501 A1 * | 5/2003 | Carlson et al. .............. 709/220 |
| 2003/0208589 A1 | 11/2003 | Yamamoto |
| 2003/0212711 A1 | 11/2003 | Fujibayashi et al. |
| 2004/0068561 A1 * | 4/2004 | Yamamoto et al. .......... 709/224 |
| 2004/0073648 A1 * | 4/2004 | Tanino et al. ................ 709/223 |
| 2005/0055428 A1 * | 3/2005 | Terai et al. .................. 709/220 |
| 2005/0195736 A1 | 9/2005 | Matsuda |
| 2005/0210137 A1 * | 9/2005 | Taguchi ...................... 709/227 |
| 2005/0262268 A1 | 11/2005 | Furukawa et al. |
| 2006/0031606 A1 * | 2/2006 | Isobe et al. ................... 710/38 |

* cited by examiner

FIG. 5

| | HBA ATTRIBUTE INFORMATION | | | FC_SW ATTRIBUTE INFORMATION | | |
|---|---|---|---|---|---|---|
| PORT NUMBER | MODEL | OS TYPE | DRIVER VERSION | MODEL | VENDER NAME | FIRMWARE VERSION |
| 1 | Model-H1 | OS1 | Ver.1.1 | Model-SW1 | Vender1 | Ver.5.1 |
| 2 | Model-H2 | OS2 | Ver.2.1 | Model-SW1 | Vender1 | Ver.5.1 |
| 3 | Model-H2 | OS2.2 | Ver.2.3 | Model-SW1 | Vender1 | Ver.5.1 |
| ... | ... | ... | ... | ... | ... | ... |

CURRENT CONFIGURATION MANAGEMENT TABLE (CHA #1) — 32A
CURRENT CONFIGURATION MANAGEMENT TABLE (CHA #2) — 32B
CURRENT CONFIGURATION MANAGEMENT TABLE (CHA #3) — 32C

SUPPORTED CONFIGURATION MANAGEMENT TABLE (T3)

| NO. | OS TYPE | HBA MODEL | DRIVER VERSION | SW MODEL | FIRMWARE VERSION | STATUS | REMARKS | COUNT |
|---|---|---|---|---|---|---|---|---|
| 1 | OS1 | Model-H1 | Ver.1.1 | Model-SW1 | Ver.5.1 | VERIFIED | RESTRICTION EXISTS (···) | +1 |
| 2 | OS1 | Model-H1 | Ver.1.5 | Model-SW2 | Ver.6.3 | VERIFIED | PROBLEM EXISTS (···) | +1 |
| 3 | OS2 | Model-H2 | Ver.2.1 | Model-SW1 | Ver.5.1 | VERIFIED | - | +1 |
| 4 | OS2.2 | Model-H2 | Ver.2.3 | Model-SW1 | Ver.5.1 | VERIFIED | - | +1 |
| 5 | OS3 | Model-H3 | Ver.3.1 | Model-SW2 | Ver.6.3 | NOT VERIFIED | - | - |
| ⋮ | ⋮ | ⋮ | ⋮ | ⋮ | ⋮ | ⋮ | ⋮ | ⋮ |

FIG. 7

| CONFIGURATION CHANGE HISTORY MANAGEMENT TABLE | | | | | | | T4 |
|---|---|---|---|---|---|---|---|
| ID | DATE | HBA MODEL | DRIVER VERSION | SW MODEL | FIRMWARE VERSION | PROGRAM GENERATION COUNT | |
| 1 | 2003/10/10 | Model-H1 | Ver.1.1 | Model-SW1 | Ver.4.0 | +2 | |
| | 2004/01/03 | Model-H1 | Ver.1.1 | Model-SW1 | Ver.4.5 | +1 | |
| | 2004/05/5 | Model-H2 | Ver.2.1 | Model-SW1 | Ver.5.1 | 0 | |
| 2 | 2004/03/03 | Model-H2 | Ver.2.1 | Model-SW1 | Ver.5.1 | 0 | |
| | 2004/06/01 | Model-H2 | Ver.2.3 | Model-SW1 | Ver.5.1 | 0 | |
| ... | ... | ... | ... | ... | ... | ... | |

SUPPORTED CONFIGURATION

| HBA MODEL | DRIVER VERSION | FIRMWARE OF STORAGE | OS TYPE | SW MODEL | FIRMWARE VERSION | FC_SW NUMBER OF CASCADES | STORAGE I/F | STORAGE TOPOLOGY | HBA TOPOLOGY | STATUS | REMARKS |
|---|---|---|---|---|---|---|---|---|---|---|---|
| H1 1 Gbps | UNDEFINED | UNDEFINED | UNDEFINED | SW1 | 5.1 | 3 | FIBER 2 Gbps | F | F | GA | ... |
| ... | ... | ... | ... | ... | ... | ... | ... | ... | ... | ... | ... |
| SPECIFIC CUSTOMER | | | | | | | | | | | PAGE 1 |

→ PAGE 1 (FOR SPECIFIC CUSTOMER) — G2

STORAGE SYSTEM

CROSS REFERENCE TO RELATED APPLICATIONS

This application is a Continuation application of U.S. application Ser. No. 11/076,208 filed on Mar. 10, 2005 now U.S. Pat, No . 7,188,201. Priority is claimed based on U.S. application Ser. No. 11/076,208 filed on Mar. 10, 2005, which claims priority to Japanese Patent Application No. 2004-370887 filed on Dec. 22, 2004, all of which is incorporated by reference.

BACKGROUND OF THE INVENTION

1. Field of the Invention

The present invention relates to a storage system.

2. Description of the Related Art

A storage system comprises one or more storage devices which are used by a plurality of host computers (hereafter "host"), for example. Each host and storage device are connected by an inter-connection device, such as a fiber channel switch and a hub.

A storage device is also called a disk array device or a storage sub-system, for example, and is comprised of many disk drives laid out in an array. The storage device provides a storage area based on RAID (Redundant Array of Independent Disks), for example. On the physical storage area of each disk drive, a logical volume (logical device), which is a logical storage area, is created. And a host, such as a server, can read/write desired data by issuing a write command or read command in a predetermined format to the storage device.

The HBA (Host Bus Adapter) installed on the host is connected to a fiber channel adapter of the storage device via a switch. The host accesses a logical volume via the fiber channel adapter and reads/writes data in block units.

A system, wherein an integrated management mechanism for integratedly controlling an SAN (Storage Area network) is installed and access between a host and storage device is systematically managed by this integrated management mechanism, was proposed (Japanese Patent Application Laid-Open No. 2002-63063).

Access to SAN is managed by the technology written about in the above document. However with this technology the configuration change of a SAN cannot be known, although this configuration changes constantly in order to handle the increases in the data volume to be managed. For example, such devices as switches and hubs are added and replaced when necessary, and a route to connect the storage device and host changes as well.

Also the user of the SAN can download driver software and firmware from the web site of a vendor, for example. The user can also update the HBA and switch when necessary, so the SAN is constantly changed by updating as well.

In this way, the configuration of the SAN is changed from the initial configuration at construction as time passes, so it is difficult to accurately know the configuration of the SAN. In other words, it is difficult to know the connection environment, such as the type of HBA the storage device is connected to, and the type of switch through which the storage device is connected.

If a communication failure occurs to a SAN when the connection environment is unknown, the system administrator and the maintenance engineer must first know the configuration of the SAN, which means that it takes time to specify the location and the cause of the failure generation, and operability, until failure recovery, drops.

Also the storage system is a system product where various information processing elements, such as a host, HBA, switch and storage device, are combined in a complicated way, and each element has various types respectively. And "compatibility" issues exist with the connection of each element. For example, even if no problem occurs when a certain type of switch and a certain type of HBA are combined, a problem may occur if one of the switch and the HBA is changed to a different type.

Therefore for the construction of the storage system, the system is designed considering the compatibility of each element. The designer of the storage system selects a combination for which stable operation is verified, out of the different combinations of elements, and determines the system configuration.

However as mentioned above, the initial configuration where the connection capability of each element is considered, which gradually changes by the change of hardware and software upgrading by the user. And the installation of unverified software for an HBA and a switch by the user, for example, may cause unexpected problems. However the configuration of the storage system at this point has been changed from the initial configuration, and it takes time to accurately know the latest connection environment of the storage system.

SUMMARY OF THE INVENTION

With the foregoing in view it is an object of the present invention to provide a storage system that can unitarily manage the configuration of the storage system by a management device, by knowing the configuration of the storage system through a storage device. It is another object of the present invention to provide a storage system which can confirm the reliability of the connection configuration in advance when the configuration of the storage system is changed. It is still another object of the present invention to provide a storage system which can manage the configuration change history of a storage system and improve the efficiency of the maintenance operation when a failure occurs. Other objects of the present invention will be clarified from the description of the embodiments herein below.

To solve the above mentioned problems, the storage system of the present invention is a storage system in which a storage device and a host are connected via an inter-connection device, comprising: a management device connected to the storage device; an information acquisition unit for acquiring and holding the connection configuration information to indicate the connection configuration between the storage device and the host; a judgment request unit for requesting judgment on the reliability of the connection configuration information acquired by the information acquisition unit; an evaluated configuration information management unit for managing evaluated configuration information to indicate a plurality of types of connection configurations of which reliability has been approved respectively; and a judgment unit for judging the reliability of the connection configuration information requested from the judgment request unit based on the connection configuration information requested from the judgment request unit and the evaluated configuration information managed by the evaluated configuration information management unit, wherein the information acquisition unit is disposed in the inter-connection device, the judgment request unit is disposed in the storage device, and the evaluated configuration information management unit and the judgment unit are disposed in the management device.

The storage device comprises, for example, such memory devices as a hard disk drive and semiconductor memory drive, and provides a logical volume to the host. The host is constructed as a computer system, such as a server machine and a main frame, for example. The host and the storage device are connected, for example, via an inter-connection device, such as a switch and a hub.

The host can further comprises a host bus adapter, for example, for performing data communication according to the fiber channel protocol (FCP) with the storage device. The storage device can further comprises a host communication adaptor for performing data communication according to the FCP with the host.

The inter-connection device further comprises an information acquisition unit. The information acquisition unit acquires and holds the connection configuration information. The connection configuration information is the connection information between the storage device and the host, and can be defined as the configuration of the communication route for connecting the storage device and the host, that is as a combination of each element constituting the communication route. The connection configuration information includes, for example, information on the type of inter-connection device through which the connection port of the storage device is connected, and the type of the communication port of the host to which the communication port of the storage device is connected.

The information acquisition unit can acquire and hold the connection configuration information by acquiring the respective attribute information from the host bus adapter (HBA) and the host communication adapter using a general service (GS-4) of the fiber channel protocol including the fabric device management interface (FDMI), for example.

In the storage device, the judgment request unit is disposed. The judgment request unit requests the judgment unit to judge the reliability of the connection configuration information. Judgment on the reliability of the connection configuration information depends on the approval of the operation by the connection configuration on whether the data can be normally transferred by the connection configuration indicated by the connection configuration information, for example. The judgment request unit may be disposed in the storage device or may be disposed in the management terminal directly connected to the storage device.

The evaluated configuration information management unit and judgment unit are disposed respectively in the management device. The evaluated configuration information management unit is for managing evaluated configuration information to indicate a plurality of types of connection configurations of which the reliability has been approved respectively. The evaluated configuration information is information of which the validity of the combination of each element (e.g. switch, HBA) to be used for data transfer has already been approved, and can include the operability of each of the plurality of combinations. The evaluated configuration information may include information on the combinations which cause a problem in operation, in addition to the information on combinations of which stable operation has been verified.

The judgment unit judges the reliability of the connection configuration information requested from the judgment request unit, based on the connection configuration information and evaluated configuration information. For example, if a configuration is the same as the connection configuration of which judgment is requested has already been registered in the evaluated configuration information, the judgment unit can judge according to the approval of the registered evaluated configuration information.

In other words, if the normal operation of the connection configuration has already been verified, the judgment unit can judge that the connection configuration indicated by the requested connection configuration information will operate normally. If it has been clear that the connection configuration will cause a problem, on the other hand, the judgment unit can judge negatively about the requested connection configuration information.

By disposing the evaluated configuration information management unit and judgment unit in the management device, the appropriateness of the connection configuration can be unitarily managed, and a systematic judgment can be made. For example, by managing a plurality of storage systems by one management device, the operation result acquired by one storage system can be utilized for the judgment of the connection configuration in another storage system. Also the management device and host may be integrated by providing the functions of the management device in one or a plurality of hosts.

The storage system may further comprise a notification unit for notifying the judgment result by the judgment unit to the storage device. The judgment result can be a positive result or a negative result. If a positive result is notified, the user can use the connection configuration and continue operation without any problem. If a negative result is notified, on the other hand, the user can examine improving the connection configuration.

The judgment request unit can transmit the acquired connection configuration information to the judgment unit and request the judgment unit to judge the reliability when the connection configuration information acquired by the information acquisition unit has been changed. In other words, only when the connection configuration of the storage system is changed, judgment on this changed configuration can be requested.

The information acquisition unit can acquire and hold the connection configuration information when the host and the inter-connection device are connected, and the judgment request unit can acquire the connection configuration information from the information acquisition unit in at least one or a plurality of cases among a case when the host and the inter-connection device are connected, a case when the host recognizes the storage device, and a case when data is transferred from the host to the storage device.

Here a predetermined command, which the host issues when the host and the inter-connection device are first connected, can be used as a trigger for the timing for the information acquisition unit to acquire the connection configuration information. By this, when the fiber cable is disconnected/connected, execution of the connection configuration information acquisition processing can be prevented. For example, by setting to issue a predetermined command at the first connection in the driver software setting screen of the HBA, the predetermined command can be issued and used as the trigger to acquire the connection configuration information.

By acquiring the connection configuration information at a predetermined timing, and requesting judgment of the acquired connection configuration information, a change of the communication configuration, which occurred by replacing the HBA and switch or by an update of the software of the HBA and switch, can be detected immediately, and judgment on the reliability thereof can be requested.

If the connection configuration information, of which judgment is requested from the judgment request unit, is judged as having a predetermined reliability, the evaluated configuration information management unit can manage this connection configuration as evaluated configuration information. For example, if only a portion which has little relationship with the fiber channel protocol was changed, this connection configuration does not match with the verified connection configuration, but normal operation can be expected. Therefore this requested connection configuration can be registered as the evaluated configuration information. If an unverified connection configuration has been operating for a predetermined period without problem, this result is approved and this connection configuration can be registered as evaluated configuration information. In this way, the evaluated configuration information can be updated based on the actual operating status. Because of this, the connection configuration which is operating normally in a storage system can be used as the information to judge the reliability of the connection configuration in another storage system.

When the connection configuration information, for which the judgment request unit requested judgment, has already been managed as the evaluated configuration information, the evaluated configuration information management unit can increase the reliability of the evaluated configuration information which has already been managed. Or when a count of failures generated in a connection configuration is counted and a predetermined number of higher number of failures is detected, this connection configuration can be judged as having low reliability.

The judgment request unit can transmit the device information to indicate the internal status of the storage device and the connection configuration information acquired by the information acquisition unit to the judgment unit respectively. By disposing the judgment request unit at the storage device side, the device information can be easily acquired, and this device information and the connection configuration information, which are associated with each other (or separately), can be transmitted to the judgment unit. Device information is information to indicate the status of the storage device, such as the device name, model, version information of a program, various statuses and the presence of failure generation.

When a failure occurs to data communication between the storage device and host, the judgment request unit can transmit failure detection information on this failure to the judgment unit, and the judgment unit can analyze the failure based on the failure detection information and the connection configuration information. The failure detection information is information on the detected failure, and includes information to indicate the occurrence of failure and the type of failure, for example. If such a failure as a time out error occurred to the communication port of the storage device, for example, and the connection configuration on the communication port has been recently changed, then it can be estimated that the change of this connection configuration is related to the cause of the failure.

All or a part of the evaluated configuration information managed by the evaluated configuration information management unit can be transmitted to the storage device. Because of this, when the connection configuration is changed, for example, the user can refer to the evaluated configuration information transmitted to the storage device, and the possibility of a configuration change error can be decreased.

The storage system can further comprise a history management unit for managing the change history of the connection configuration information, wherein the judgment unit can judge the reliability of the connection configuration information requested from the judgment request unit based on the connection configuration information requested from the judgment request unit, the evaluated configuration information managed by the evaluated configuration information management unit, and the change history managed by the history management unit. By managing the change history of the connection configuration information, the reliability of the connection configuration information can be accurately judged. The history management unit can be disposed in the management device, for example.

The storage system can further comprise an alarm unit for outputting an alarm on the reliability of the connection configuration information to the storage device when the judgment unit judges that the reliability of the connection configuration information is at a predetermined low level. In other words, an alarm is output to attract the user's attention when the connection configuration has low reliability which could cause a failure. Because of this, if a connection configuration with a low reliability is detected by a storage system, an alarm can be output to other storage systems about this connection configuration with low reliability.

All or a part of the configuration of the present invention may be constructed as a computer program to be executed by a microcomputer. This computer program can be distributed as a fixed program stored on such a storage medium as a hard disk, optical disk and semiconductor memory, or can be distributed via a communication network, such as the Internet.

BRIEF DESCRIPTION OF THE DRAWINGS

FIG. 5 shows a structure of the current configuration management table;

FIG. 6 shows a structure of a supported configuration management table;

FIG. 7 shows a structure of the configuration change history management table;

FIG. 8 shows a supported configuration management screen displayed on the screen of the management terminal;

DESCRIPTION OF THE PREFERRED EMBODIMENTS

Embodiments of the present invention will now be described with reference to the drawings. In the present embodiment, as described herein below, the connection configuration information to indicate the connection configuration between the storage device 3 and the host 1 is collected and held by the switch 2, and the storage device 3 acquires the connection configuration information held in the switch 2, requests the management server 4 to judge the reliability of this connection configuration information, and the management server 4 returns the judgment result to the storage device 3.

Figure 1:
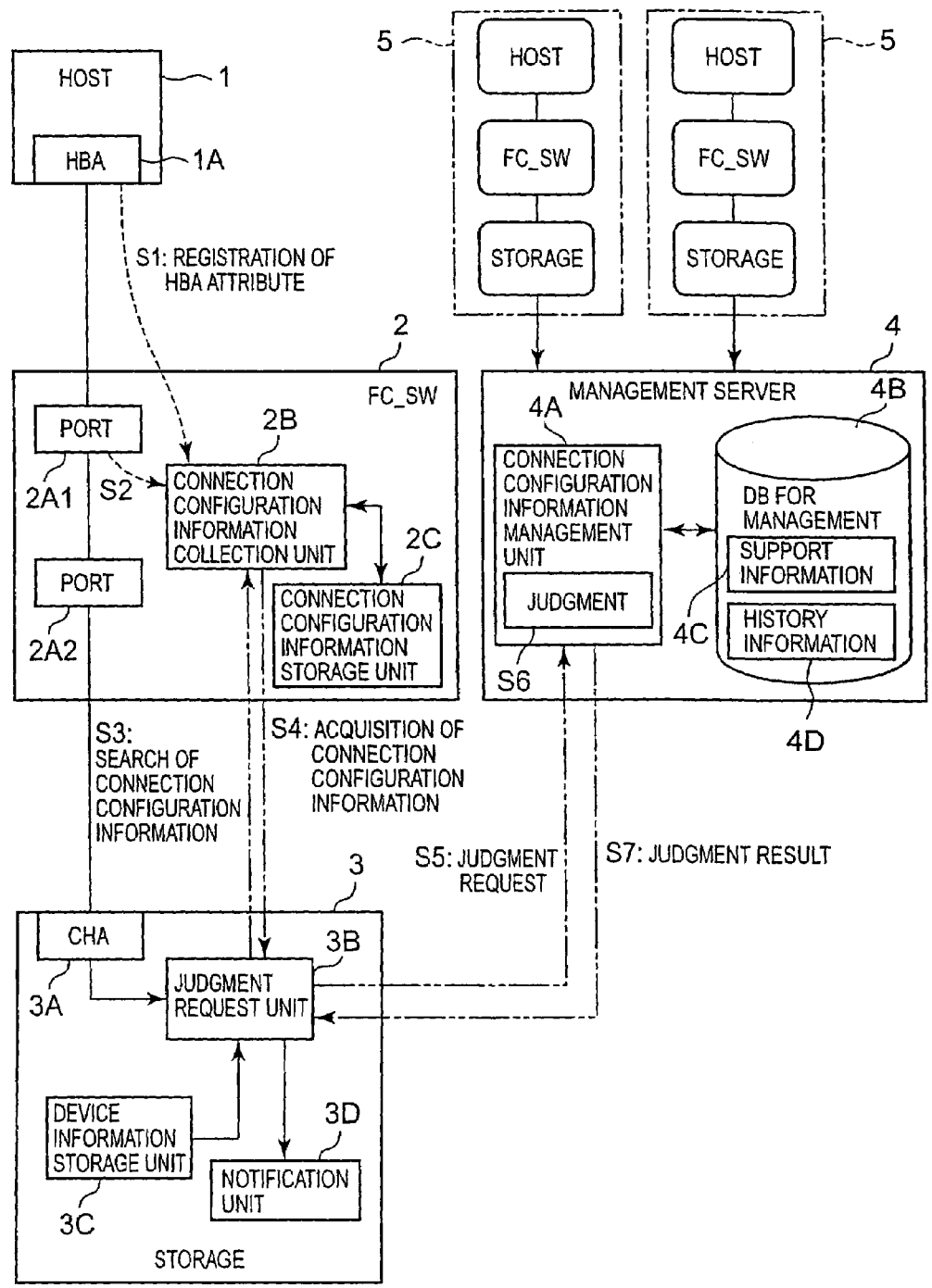
FIG. 1 is a diagram depicting the concept of an embodiment of the present invention.

FIG. 1 is a diagram depicting the general concept of the present invention. FIG. 1 includes a plurality of storage systems, and the configuration of each of these storage system is unitarily managed by the management server 4.

In the case of the storage system at the left in FIG. 1, the host 1 is constructed, for example, as a computer device, such as a server machine, and comprises at least one HBA 1A for performing data transmission/receiving based on the fiber channel protocol. HBA 1A is connected to the port 2A1 of the switch 2.

The switch ("FC-SW" in FIG. 1) 2 is a device for connecting the host 1 and the storage device 3. The switch 2 is comprised of a plurality of ports 2A1 and 2A2, the connection configuration information collection unit 2B, and the connection configuration information storage unit 2C. In FIG. 1, only two ports, 2A1 and 2A2, are shown to make explanation easier, but many more ports can be connected in actual usage. The port at the host side and the port at the storage device side can be freely connected.

The connection configuration information collection unit 2B is for collecting the attribute information of the HBA 1A and the attribute information of the local switch 2. Here the attribute information of the HBA 1A includes, for example, the model of the HBA 1A, version information of the corresponding OS (Operation System), vendor name, and version information of the driver software. The attribute information of the switch 2 includes, for example, the model, vendor name, and version information of the firmware. The attribute information of the HBA 1A and the attribute information of the switch 2 are associated with each other, and are stored in the connection configuration information storage unit 2C. An example of the connection configuration information is the combined information of the attribute information of the HBA 1A and the attribute information of the local switch 2.

If both the HBA 1A and the switch 2 conform to the standard of the fiber channel protocol known as FC-GS-4, for example, then FDMI (Fabric Device Management Interface) covered by this standard can be used. By using FDMI, such attribute information as the mode name, manufacturer, serial number, model, hardware version, driver version, firmware version, OS name and OS version can be acquired. If the HBA 1A does not conform to the FC-GS-4 standard even if the switch 2 does, then the attribute information cannot be acquired by FDMI. Both must conform to the FC-GS-4 standard. The FC-GS-4 standard and FDMI are merely examples, and the present invention is not limited to these. If another standard to be developed in the future allows the acquisition of attribute information, then this standard can be used.

The storage device 3 provides a storage area to the host 1. The storage device 3 can be comprised, for example, of a channel adapter ("CHA" in FIG. 1) 3A as a host communication adapter, judgment request unit 3B, device information storage unit 3C and notification unit 3D.

The CHA 3A performs data communication with the host 1 according to the fiber channel protocol. The CHA 3A is connected to the port 2A2 of the switch 2, and is connected to the host 1 via the switch 2.

The judgment request unit 3B acquires the connection configuration information held by the switch 2 periodically or non-periodically, and requests the management server 4 to judge the reliability of this connection configuration information. The judgment request unit 3B can access the switch 2 via the CHA 3A, and read the connection configuration information.

The device information storage unit 3C stores information in the storage device 3. The device information is, for example, attribute information of the storage device, such as the name, model and version information, as well as the load status (I/O) of the storage device 3, generation of failure, remaining memory and configuration information.

The judgment request unit 3B judges whether the connection configuration information acquired from the switch 2 has changed compared with that acquired previously, and can send the connection configuration information to the management server 4 only when changed. The judgment request unit 3B can send the connection configuration information to the management server 4 when the connection configuration information is acquired from the switch 2, regardless the difference from that acquired previously. Also the judgment request unit 3B can send the device information read from the device information storage unit 3C to the management server 4 when a failure occurs or regardless whether a failure occurs or not.

The notification unit 3D displays the information received from the management server 4 on such an information output device as a display. The notification method is not limited to the display on the screen, but may be a voice message by a voice synthesis device. The judgment request unit 3B, device information storage unit 3C and notification unit 3D need not be disposed in the storage device 3, but may be disposed, for example, in the computer terminal directly connected to the storage device 3.

The management server 4 is a computer device for unitarily managing the configuration of a plurality of storage systems. Not only the above mentioned storage system, which is comprised of the host 1, switch 2 and storage device 3, but also other storage systems 5 can be connected to the management server 4. These storage systems 5 have the same configuration as the above mentioned storage system, and the respective connection configuration information is collected to the management server 4.

The management server 4 can be comprised, for example, of the connection configuration information management unit 4A and data base for management ("DB for management" in FIG. 1) 4B. The management server 4 is connected to the storage device 3 of each storage system respectively, via such a communication network as a LAN (Local Area Network) and a WAN (Wide Area Network), for example.

The connection configuration information management unit 4A stores the connection configuration information received from the storage device 3 in the data base for management 4B, and manages it. The connection configuration information management unit 4A also refers to the information in the data base for management 4B, and judges the reliability of the connection configuration information, and sends the judgment result to the storage device 3.

The data base for management 4B can store the support information 4C and history information 4D. In the support information 4C, which is an example of "evaluated configuration information", information on the combination of the HBA and switch, of which normal operation has been verified, is registered. The support information 4C is not only updated based on the connection configuration information collected from each storage system, but is also updated based on the information provided by each vendor.

In the history information 4D, the history of the configuration change of each storage system is recorded. The history information 4D is updated based on the connection configuration information collected from each storage system. The history information 4D can include the history of failures which occurred in each storage system.

Other storage systems 5 under the management of the management server 4 comprise a similar configuration as the above mentioned host 1, switch 2 and storage device 3, and collect the combination information (connection configuration information) of the HBA and switch (port), and send it to the management server 4 respectively.

Now the operation will be described. First the attribute information of the HBA 1A is stored in the connection configuration information storage unit 2C via the connection configuration information collection unit 2B (S1). The attribute information on the port 2A1 of the switch 2 is also stored in the connection configuration information storage unit 2C via the connection configuration information collection unit 2B (S2). To collect this attribute information, FDMI, for example, is used.

Various timings can be used for the timing to store each attribute information in the connection configuration information storage unit 2C, that is, a timing to collect each attribute information, and an example is a timing when the host 1 and switch 2 are connected.

If the attribute information on the host 1 and switch 2 is collected when the host 1 and switch 2 are connected for the first time, the start of collecting each attribute information can be prevented when the fiber channel cable connecting the host 1 and switch 2 is merely disconnected, and the burden on configuration management can be decreased. If it is set such that a predetermined command is issued at the first connection on the setup screen of the driver software of the HBA 1A, the issue of this command can be used as a trigger to start collecting each attribute information.

The storage device 3 accesses the switch 2 periodically or non-periodically, and searches the information stored in the connection configuration information storage unit 2C (S3), and acquires the connection configuration information from the connection configuration information storage unit 2C (S4). When the storage device 3 acquires the connection configuration information from the switch 2, FDMI, for example, is used.

There are a plurality of cases possible as a timing for the storage device 3 to acquire the connection configuration information from the switch 2. One is the case when the host 1 and switch 2 are connected. A second is the case when the host 1 logically recognizes the storage device 3. A third is the case when the host 1 transfers data to the storage device 3 (e.g. before transfer). A fourth is the case when notification from the switch 2 is received. And a fifth is the case when the storage device 3 recognizes the host 1 again. Each attribute information is stored in the connection configuration information storage unit 2C at one or at one or more of these timings. By this, the latest connection configuration between the host 1 and switch 2 can be quickly detected.

Or the storage device 3 may acquire the connection configuration information at each predetermined time. Or the storage device 3 may acquire the connection configuration information each time a predetermined event, which is preset, is generated. The predetermined event is, for example, the case when such a failure as a time out error is detected, the case when the configuration in the storage device 3 is changed (e.g. attachment/detachment of control package, increase/decrease of the hard disk drive size), and the case when the user sends an explicit request.

The judgment request unit 3B can judge whether the connection configuration information acquired from the switch 2 has changed from the previous acquisition. If the connection configuration information at the previous acquisition and the connection configuration information acquired this time match, this means that the connection configuration has not been changed. Therefore it is unnecessary to determine a judgment on the reliability of the acquired connection configuration information. Whereas if the connection configuration information acquired this time is different from the connection configuration information acquired the previous time, this means that the connection configuration has changed. Therefore the judgment request unit 3B sends the latest connection configuration information to the management server 4, and requests an evaluation on the reliability thereof (S5).

Even when the connection configuration information has not been changed, the connection configuration information can be sent to the management server 4. In this case, the operation history with that connection configuration can be managed by the management server 4 side. If the storage device 3 detects a failure, the storage device 3 can send the information on this failure to the management server 4. Also the storage device 3 can send the device information on the storage device 3 to the management server 4.

When the connection configuration information is received from the storage device 3, the management server 4 refers to the stored content of the data base for management 4B, and judges the reliability of the connection configuration information thereof (S6). For example, if the connection configuration, the same as the connection configuration information on which judgment is requested, is registered in the support information 4C, this means that normal operation is guaranteed for the connection configuration. Therefore in this case, it can be evaluated that this connection configuration information has high reliability.

Even when the connection configuration information on which judgment is requested and the configuration registered in the support information 4C do not match, high evaluation can be given to the connection configuration information (this means that normal operation will be possible with the connection configuration) if the difference is within the non-critical difference range for data transfer by FCP.

Non-critical difference means a difference that does not affect data transfer by FCP, as in a model change due to an increase/decrease in the number of ports of the switch 2. In such a case, high evaluation can be given based on the configuration registered in the support information 4C.

Also even in the case of a connection configuration for which the vendor has not completed verification, the same connection configuration may have been operating normally in another storage system 5 for a predetermined period. Such a history of actual operation can be incorporated into the support information 4C. Therefore even for a connection configuration for which the vendor has not verified, the management server 4 can give high evaluation to the connection configuration information.

Whereas when the connection configuration information for which judgment is requested does not match with the configuration registered in the support information 4C (beyond non-critical difference), or when the connection configuration matches the configuration which caused a problem in another storage system 5, or when the connection configuration matches the configuration indicated by an alarm by the vendor, a negative evaluation can be given to the connection configuration information.

And the management server 4 sends the judgment result on the reliability of the connection configuration information to the storage device 3 (S7). The notification unit 3D of the storage device 3 notifies the user by displaying the judgment result from the management server 4 on the screen.

For the transmission method and the notification method of the judgment result, various methods can be used. For example, the management server 4 can notify the storage device 3 only when a negative judgment (alarm) is output. The management server 4 can also notify both the positive judgment result and the negative judgment result to the storage device 3. Or the management server 4 can transmit a negative or positive judgment result and all or a part of the support information 4C can be sent to the storage device 3.

Also the management server 4 can send all or a part of the support information 4C and the history information 4D to the storage device 3 according to the request of the user, separately from the transmission of the judgment result. The management server 4, however, can send only information that the user of each storage system has the right to read.

According to the present embodiment configured in this way, the information on the configuration of the storage system is collected by the management server 4 via the storage device 3, and the configuration of the storage system can be unitarily managed by the management server 4. Therefore the latest configuration of the storage system can be quickly known and promptly handle a failure if one occurs.

In the present embodiment, the support information 4C is systematically managed within the management server 4. So the information on a new combination for which verification completed can be sent only to the management server 4 to update the support information 4C, and the support information 4C can be easily managed. Also the latest support status can be known only by accessing the support information 4C.

According to the present embodiment, when the configuration of the storage system is changed, the switch 2 collects the connection configuration information on this configuration change, and the storage device 3 requests the management server 4 to judge the reliability of this connection configuration information. Therefore before the storage system of which configuration has changed starts actual operation, the reliability of the connection configuration related to this change can be evaluated in advance, and the generation of a failure can be decreased. By this early diagnosis before actual operation, the possibility of avoiding a failure is increased, and the reliability of the storage system can be improved.

According to the present embodiment, the history of the change of configuration is managed within the management server 4 as the history information 4D, so if a failure occurs to the storage device 3, the cause of the failure can be easily analyzed, and the efficiency of the maintenance operation is improved. Also the quality of the storage system can be managed based on the information stored in the data base for management 4B of the management server 4.

According to the present embodiment, the issue of a predetermined command in the first connection of the host 1 and switch 2 is used as the connection configuration information collection (registration) timing. Therefore the start of the collection processing of the connection configuration information can be prevented when the cable connecting the host 1 and switch 2 is merely disconnected. As a result, the configuration of the storage system can be detected and managed without causing a large burden on the storage system.

1. First Embodiment

Figure 2:
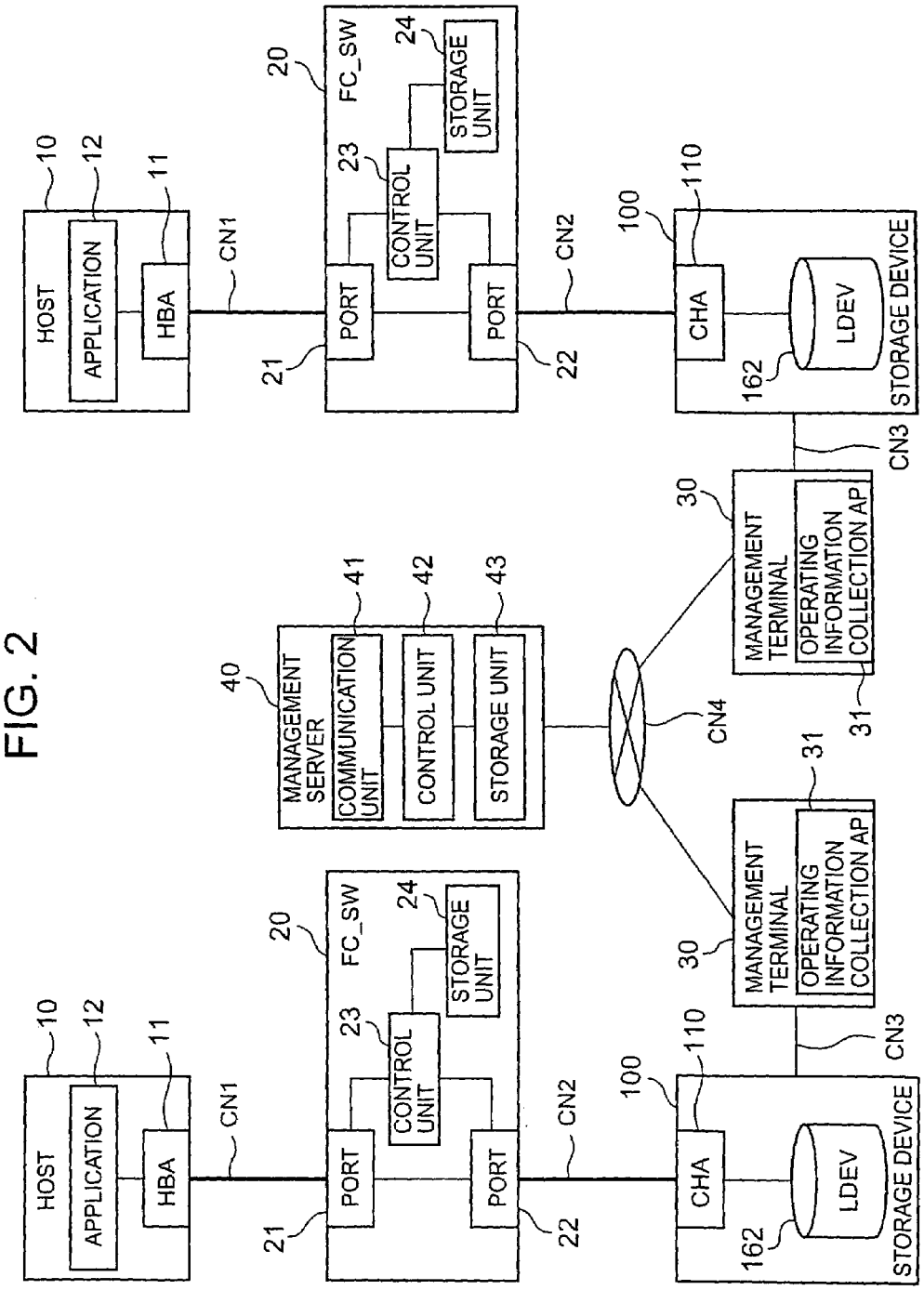
FIG. 2 is a block diagram depicting the general configuration of the storage system.

FIG. 2 is a block diagram depicting the general configuration of the present invention. In FIG. 2, a storage system is shown on both sides, at the right and left. Each storage system is comprised, for example, of a host 10, switch 20, management terminal 30 and storage device 100. Information on the respective configuration of these plurality of storage sub-systems can be unitarily managed by the management server 40. FIG. 2 shows two storage systems, but three or more storage systems may be managed by one management server 40.

The host 10 is such a computer device as a server machine, for example. The host 10 comprises at least one HBA 11 and application program (hereafter "application") 12. HBA 11 can perform data communication based on FCP, and conforms to the FC-GS-4 standard. The application 12 is comprised of a data base management program and electronic management program, for example, and accesses the storage device 100 via the HBA 11, and reads/writes the desired data.

The switch 20 connects the host 10 and the storage device 100. A known connection format (topology) is, for example, fabric, FC-AL (arbitrated) and a mix of fabric and FC-AL. In FIG. 2, one switch 20 is shown in each storage system, but a plurality of switches 20 may be connected.

The switch 20 can be comprised, for example, of a plurality of ports 21 and 22, control unit 23 and storage unit 24. One port 21 is connected to the HBA 11 of the host 10 via the communication cable CN 1. The other port 22 is connected to the channel adapter (hereafter "CHA") 110 of the storage device 100 via the communication cable CN 2. Normally more ports are connected, but here only two ports, 21 and 22, are shown to make explanation easier. Each communication cable CN 1 and CN 2 are, for example, an optical fiber cable or metal cable. The switch 20 conforms to the FC-GS-4 standard.

The control unit 23 controls the connection of each port 21 and 22. The storage unit 24 is, for example, a semiconductor memory, and stores the attribute information of the HBA 11 and port 21 in association with each other, as described later.

Details of the storage device 100 will be described later, but the storage device 100 is comprised of a CHA 110 as a host communication adapter and a logical volume 162. The host 10 accesses the logical volume 162 from the switch 20 via the CHA 110, and reads/writes the desired data. The CHA 110 conforms to the FC-GS-4 standard.

The management terminal 30 is a computer device, and is directly connected to the storage device 100 via such a network CN 3 as a LAN. The management terminal 30 comprises an operating information collection application 31 (in the drawings "application program" is indicated as "AP"), which is an example of the "judgment request unit". Hereafter this application 31 is referred to as the collection AP 31.

The collection AP 31 acquires the attribute information held in the switch 20 via the storage device 100. The collection AP 31 can also acquire the device information in the storage device 100. The collection AP 31 sends this collected information to the management server 40 via the communication network CN 4, such as a WAN. And when the collection AP 31 receives information from the management server 40, the collection AP 31 displays this information on the terminal screen for the user.

The management server 40 can be a computer device comprising a communication unit 41, control unit 42 and storage unit 43, for example. The communication unit 41 performs data communication with the management terminal 30 via the communication network CN 4. The control unit 42 analyzes the information received from the management terminal 30, and returns the analysis result. The storage unit 43 stores the information received from the management terminal 30 and the information which is input from the outside.

Figure 3:
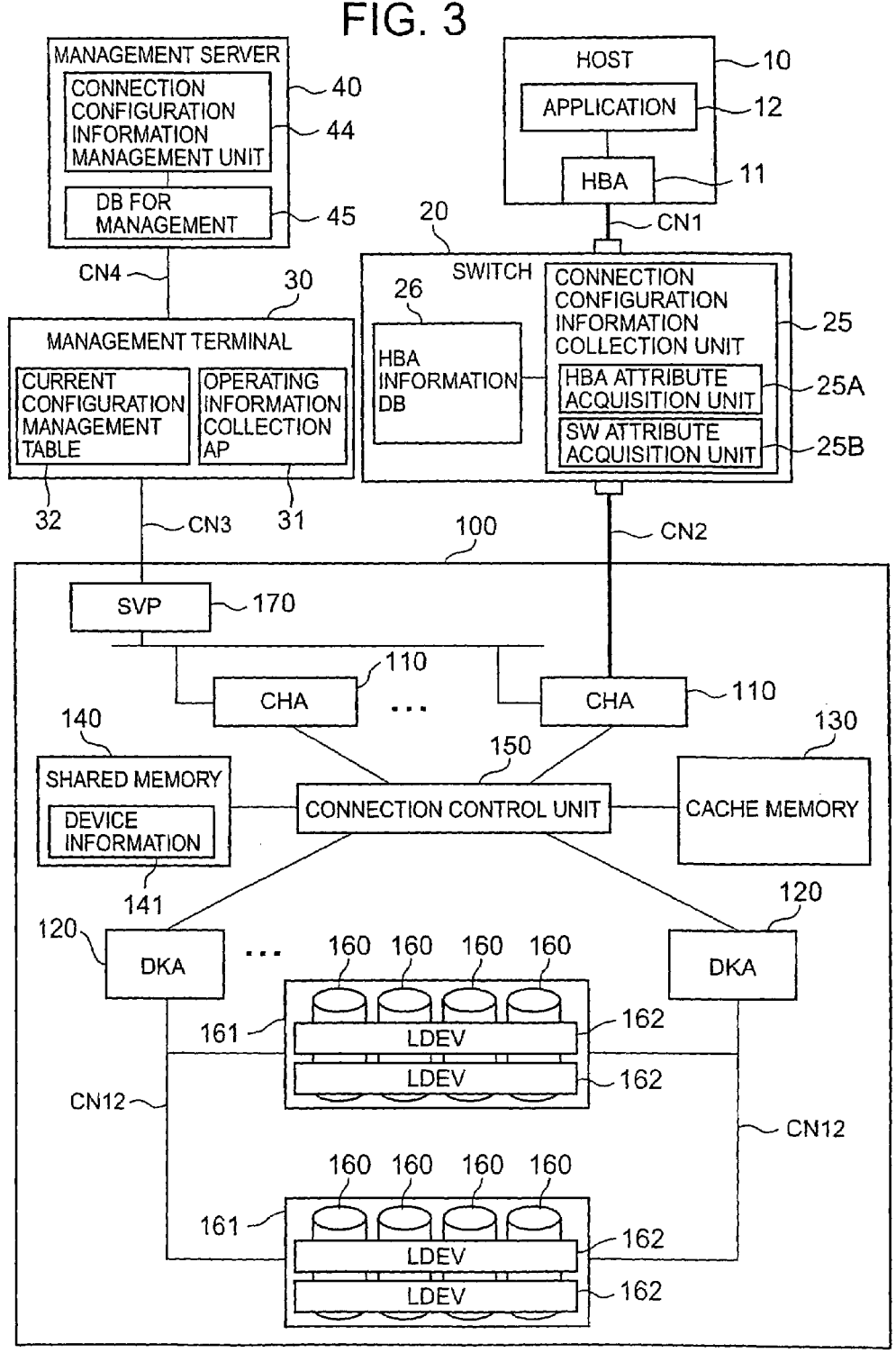
FIG. 3 is a block diagram depicting the storage system.

FIG. 3 is a block diagram depicting a detailed configuration of the storage system. In terms of the functional configuration of the switch 20, the switch 20 comprises the connection configuration information collection unit 25 and the HBA information data base 26. The connection configuration information collection unit 25 is mainly implemented by the control unit 23. The connection configuration information collection unit 25 acquires the attribute information of the HBA 11 and the port 21 respectively by using FDMI, for example. The HBA information data base 26 is mainly implemented by the storage unit 24. The HBA information data base 26 manages the attribute information collected by the connection configuration information collection unit 25.

In terms of the functional configuration of the management terminal 30, the management terminal 30 comprises a current configuration management table 32 in addition to the collection AP 31. This current configuration management table 32 holds the latest connection configuration. The connection configuration refers to the configuration on the connection between the storage device 100 and the host 10. More specifically, the information on the connection configuration is information corresponding the attribute information of the switch 20 and the attribute information of the HBA 11, for example. The current configuration management table 32 holds the connection configuration information which is most recently acquired.

In terms of the functional configuration of the management server 40, the management server 40 comprises the connection configuration information management unit 44 and the data base for management 45. The connection configuration information management unit 44 is mainly implemented by the control unit 42. The connection configuration information management unit 44 manages and analyzes the connection configuration information acquired from the management terminal 30. The connection configuration information management unit 44 stores the connection configuration information and other information in the data base for management 45.

The data base for management 45 is mainly implemented by the storage unit 43. In the data base for management 45, the supported configuration management table T3 and the configuration change history management table T4 are stored, as described later.

The storage device 100 is comprised of a channel adapter (hereafter "CHA") 110, disk adapter (hereafter "DKA") 120, cache memory 130, shared memory 140, switch unit 150, disk drive 160 and service processor (hereafter "SVP") 170, as described later respectively.

The CHA 110 controls data transfer with the host 10, and can comprise a plurality of ports. A plurality of CHAs 110 can be installed in the storage device 100. Each CHA 110 receives commands and data for requesting a read/write of data from the respective host 10 connected thereto, and operates according to the command received from the host 10.

In this operation, including the operation of the DKA 120, the CHA 110 receives the read command from the host 10, and stores this read command in the shared memory 140. When an unprocessed read command is discovered, the DKA 120, which refers to the shared memory 140 when necessary, reads the data from the disk drive 160 and stores it in the cache memory 130. The CHA 110 reads the data transferred to the cache memory 130, and sends it to the host 10.

When a write command is received from the host 10, the CHA 110 stores this write command in the shared memory 140. The CHA 110 also stores the received data in the cache memory 130. After data is stored in the cache memory 130, the CHA 110 reports to the host 10 that writing completed. The DKA 120 reads the data stored in the cache memory 130 according to the write command stored in the shared memory 140, and stores it in a predetermined disk drive 160.

A plurality of DKAs 120 can be installed in the storage device 100. Each DKA 120 is a computer which controls the data communication with each disk drive 160 respectively. Each DKA 120 and each disk drive 160 are connected via such a communication network CN 12 as a SAN, for example, and performs data transfer in block units according to the fiber channel protocol. Each DKA 120 monitors the status of each disk drive 160 when necessary, and this monitoring result is sent to the SVP 170 via such an internal network CN 11 as a LAN.

Each CHA 110 and each DKA 120 comprises a printed circuit board on which processors and memories are mounted, and a control program stored in the memory (both are not illustrated) respectively, and predetermined functions are implemented by the co-operating work of this hardware and software.

The cache memory 130 stores data. The cache memory 130 can be a non-volatile memory, for example. The write data can be redundantly stored in the cache memory 130.

The shared memory (or control memory) 140 can be a non-volatile memory, for example. The shared memory 140 stores the control information and management information, for example. This information, such as control information, can be multiplex-managed by a plurality of shared memories 140. A plurality of shared memories 140 and cache memories 130 can be installed respectively.

It is also possible to mix-mount the cache memories 130 and shared memories 140 on a same memory board. Or a part of a memory can be used as a cache area and another part thereof can be used as a control area.

The switch unit 150 connects each CHA 110, each DKA 120, and cache memory 130 and shared memory 140 respectively. By this, all the CHAs 110 and DKAs 120 can access the cache memory 130 and shared memory 140 respectively. The switch unit 150 can be constructed as an ultra-high-speed crossbar switch, for example.

The SVP 170 is connected to each CHA 110 via the internal network CN 11 respectively. The SVP 170 can access the shared memory 140 via the CHA 110. The SVP 170 can perform data communication with the DKA 120 via the shared memory 140. The SVP 170 can be connected to the management terminal 30 via the communication network CN 3. The SVP 170 collects various status information inside the storage device 100 according to a request from the management terminal 30, and sends it to the management terminal 30.

Each disk drive 160 can be comprised, for example, of various storage devices, such as a hard disk drive, flexible disk drive, magnetic tape drive, semiconductor memory drive, optical disk drive and magneto-optical disk drive, and equivalents thereof. In the case of a hard disk drive, an FC (Fiber Channel) disk, SATA (Serial AT Attachment) disk or SAS (Serial Attached SCSI) disk, for example, can be used. Different disk types can be mixed on one equipment body.

A plurality of disk drives 160 constitute a parity group (also called a RAID group) 161, such as three hard disk drives as one set, or four hard disk drives as one set, depending on the configuration of the RAID. A same parity group 161 is comprised of a same time of disk drive 160. At least one or more logical volumes ("LDEV" in FIG. 3) can be set on the storage area provided by each parity group 161. The host 10 recognizes the logical volume 162, and writes data to the logical volume 162, or reads data from the logical volume 162.

The storage resources provided by the storage device 100 to the host 10 need not all be stored in the storage device 100. The storage device 100 can load a storage resource existing outside the storage device 100 and use it as if it was part of its own storage resource. In this case, a virtual intermediate device (corresponding to the parity group 161) is installed, and an external volume is assigned to this virtual intermediate device.

Figure 4:
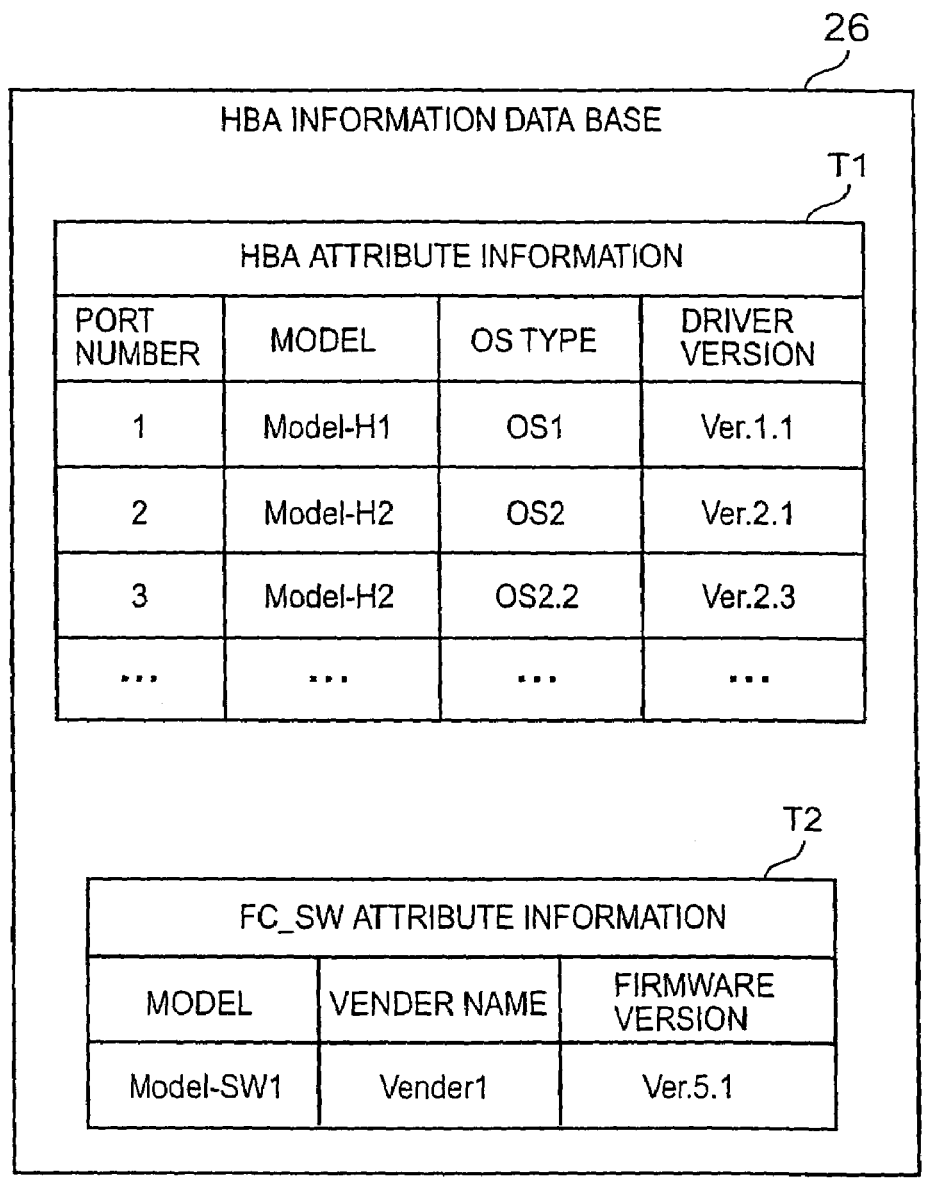
FIG. 4 shows a structure of the HBA information data base.

FIG. 4 shows an example of the information stored in the HBA information data base 26. In the HBA information data base 26, the HBA attribute information T1 and the switch attribute information T2 can be associated with each other and stored, for example.

The HBA attribute information T1 is the attribute information acquired from the HBA 11 by FDMI, and includes, for example, information for specifying a port connected to the HBA 11 (port number), model name of the HBA 11, the type and version number of the OS supported by the HBA 11, and the version number of the driver software of the HBA 11.

The switch attribute information T2 is the attribute information on the switch 20. The switch attribute information T2 can include, for example, the model name of the switch 20, vendor name of the switch 20 and the version number of the firmware of the switch 20. The switch attribute information T2, which is a common within that switch 20, is managed as a separate information. The switch attribute information T2, however, may be stored corresponding to each HBA connected to each port.

FIG. 5 shows an example of the current configuration management table 32. As 32A-32C in FIG. 5 shows, the current configuration management table 32 can be provided for each CHA 110.

In the current configuration management table 32, the port number for identifying each port of the CHA 110, the attribute information of the HBA 11 connected to each port and the attribute information (switch attribute information) of each port can be stored in association with one another respectively.

The HBA attribute information is, for example, the model name of the HBA 11, the type and version of the OS supported by the HBA 11, and the version information of the driver software of the HBA 11. The type and the version of the OS supported by the HBA 11 correspond to the type and version of the OS of the host 10. The switch attribute information is, for example, the model name of the switch 20, vendor name of the switch 20 and version information of the firmware of the switch 20.

FIG. 6 shows an example of the supported configuration management table T3 managed by the management server 40. This supported configuration management table T3 is an example of the "evaluated configuration information".

The supported configuration management table T3 manages the information on the combination of devices of which normal operation is confirmed. In other words, the supported configuration management table T3 registers the combinations of which normal operation has been verified out of the various combinations of the HBA 11 and the switch 20. This information on the combinations of which normal operation has been verified is actively or passively provided from the vendor of the HBA 11, vendor of the switch 20 and vendor of the storage device 100, for example. In the present embodiment, not only the information from the vendor, but also the configuration which is actually operating without problem can be registered in the table T3 as the supported configuration.

The supported configuration management table T3 can be comprised, for example, of an item number, type and version number of the OS supported by the HBA 11, model name of the HBA 11, version information of the driver software of the HBA 11, model name of the switch 20, version information of the firmware of the switch 20, status of the combination of the HBA 11 and switch 20, remarks on this combination and count information, which are associated with each other respectively.

Here for the "status", such a status as "verified" and "not verified", for example, can be provided. Verified status indicates that it has been confirmed that the combination of this HBA 11 and the switch 20 operates normally. Not verified status indicates that it has not yet been verified that this combination operates normally. (The combination which is not registered in table T3 but is actively operating has "not verified" status.)

In addition to this, such a status as "field proven" may be provided. "Field proven" status indicates that the combination which is slightly different from the registered verified combination can be judged as substantially verified. "Field proven" status can be provided to the connection configuration information received from the management terminal 30, for example. If "field proven" status continues for a predetermined period, or of which normal operation is confirmed by an additional test, the status may be changed to "verified".

In the "remarks" in the management table T3, precautions on using the combination can be stored. The "count" information indicates the number of configurations acquired from the obtained connection configuration information. In other words, it is shown how frequently a configuration has been operated.

FIG. 7 shows an example of the configuration change history management table T4 managed by the management server 40. The configuration change history management table T4 manages the history of the configuration change of each storage system. This history table T4 is comprised, for example, of an identification number (ID) for identifying each storage system, date and time when the configuration of a combination changed (date and time when an entry is added), model name of the HBA, version information of the driver software of the HBA, model name of the switch, version information of the firmware of the switch, and number of failures which occurred with the combination, which are associated with each other respectively.

In this way, if the HBA 11 and the switch 20 are physically or logically changed in each storage system, the information on this changed connection configuration is registered in the history table T4 along with the changed date and time. Therefore by searching the combination of which the changed date and time is the most recent, the latest configuration of the storage system can be easily known.

FIG. 8 shows an example of the "Supported Configuration" screen displayed on the screen of the management terminal 30. In this screen G1, the information on the combination of the HBA 11 and the switch 20, of which normal operation is confirmed, is displayed. By referring to this screen G1, the user can consider a change of the configuration of the storage system.

The supported configuration display screen G1 is comprised, for example, of the model name of the HBA 11, version information of the driver software of the HBA 11, type and version of the OS supported by the HBA 11, model name of the switch 20, version information of the firmware of the switch 20, number of connected switches 20 (number of cascades), interface type of the storage device 100, topology of the interface of the storage device 100, topology of the interface of the HBA 11, status code and remarks, which are associated with each other respectively in a table format.

A special configuration for a specific customer may be displayed on another screen G2 by clicking.

Figure 9:
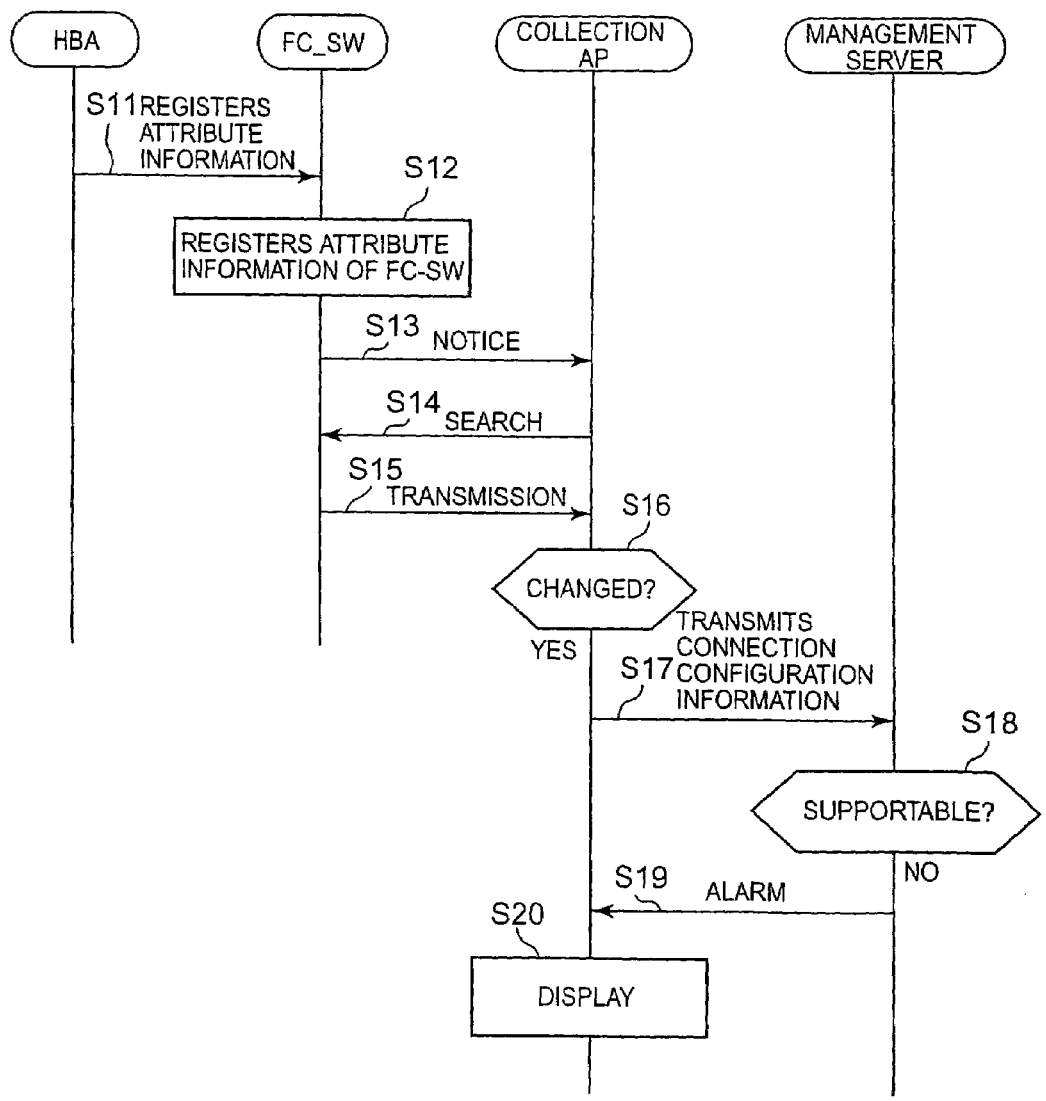
FIG. 9 is a sequence flow chart depicting the general operation of the storage system.

Operation of this storage system will now be described with reference to FIG. 9 to FIG. 17. FIG. 9 is a sequence flow chart depicting a general operation of the storage system.

When the HBA 11 is replaced or the driver software of the HBA 11 is updated, for example, the connection between the HBA 11 and the switch 20 is disconnected once, then connected again. If the connection between the HBA 11 and the switch 20 is detected, the registration processing of the connection configuration information is started.

First the attribute information of the HBA 11 is registered in the HBA information data base 26 of the switch 20 by FDMI (S11). Then the switch 20 registers its own attribute information in the HBA information data base 26 (S12). The attribute information of the HBA 11 and the attribute information of the switch 20 are associated with each other and managed in the HBA information data base 26.

When the connection of the HBA and the switch is restarted, the switch 20 notifies this to the storage device 100 (S13), and the collection AP 31 accesses the HBA information data base 26 at the timing of this notification, and searches the registered attribute information (S14). The collection AP 31 acquires the registered combination of the attribute information from the HBA information data base 26 (S15).

The collection AP 31 compares the combination of the attribute information obtained from the switch 20 and the latest combination registered in the current configuration management table 32 (S16). If the combination acquired this time and the combination acquired in a previous time are different, this means that the connection configuration changed. Therefore the collection AP 31 sends this combination attribute information (connection configuration information) to the management server 40 via the communication network CN 4 (S17).

When the connection configuration information is received from the collection AP 31, the management server 40 refers to the supported configuration management table T3, and judges whether the connection configuration, shown in the connection configuration information, is supportable (S18). If the combination of each attribute information indicated by the connection configuration information received from the collection AP 31 is registered in the supported configuration management table T3, the changed connection configuration can be supported.

Whereas if the combination of each attribute information indicated by the connection configuration information received from the collection AP 31 is not registered in the supported configuration management table T3, it is unknown whether the changed connection configuration will operate normally. Therefore the management server 40 sends an alarm to the collection AP 31 (S19). The alarm can include a message that normal operation cannot be guaranteed under this connection configuration, and a supported configuration list, for example.

When the notice is received from the management server 40, the collection AP 31 displays the notified content on the screen of the management terminal 30 (S20). The user can confirm the reliability of the changed configuration by checking the screen of the management terminal 30. The user who considers this evaluation can adjust the configuration of the storage system by returning the changed configuration back to the original configuration or by changing the configuration to a supported configuration, for example. If the configuration is changed again, the above mentioned processing is repeated, and the reliability is evaluated again.

In this way, when the configuration of the storage system is changed, the present storage system can evaluate the reliability of the changed configuration in advance, and a failure which may occur after the storage system is actually operated can be prevented. Now the content of each processing will be described with reference to other drawings.

Figure 10:
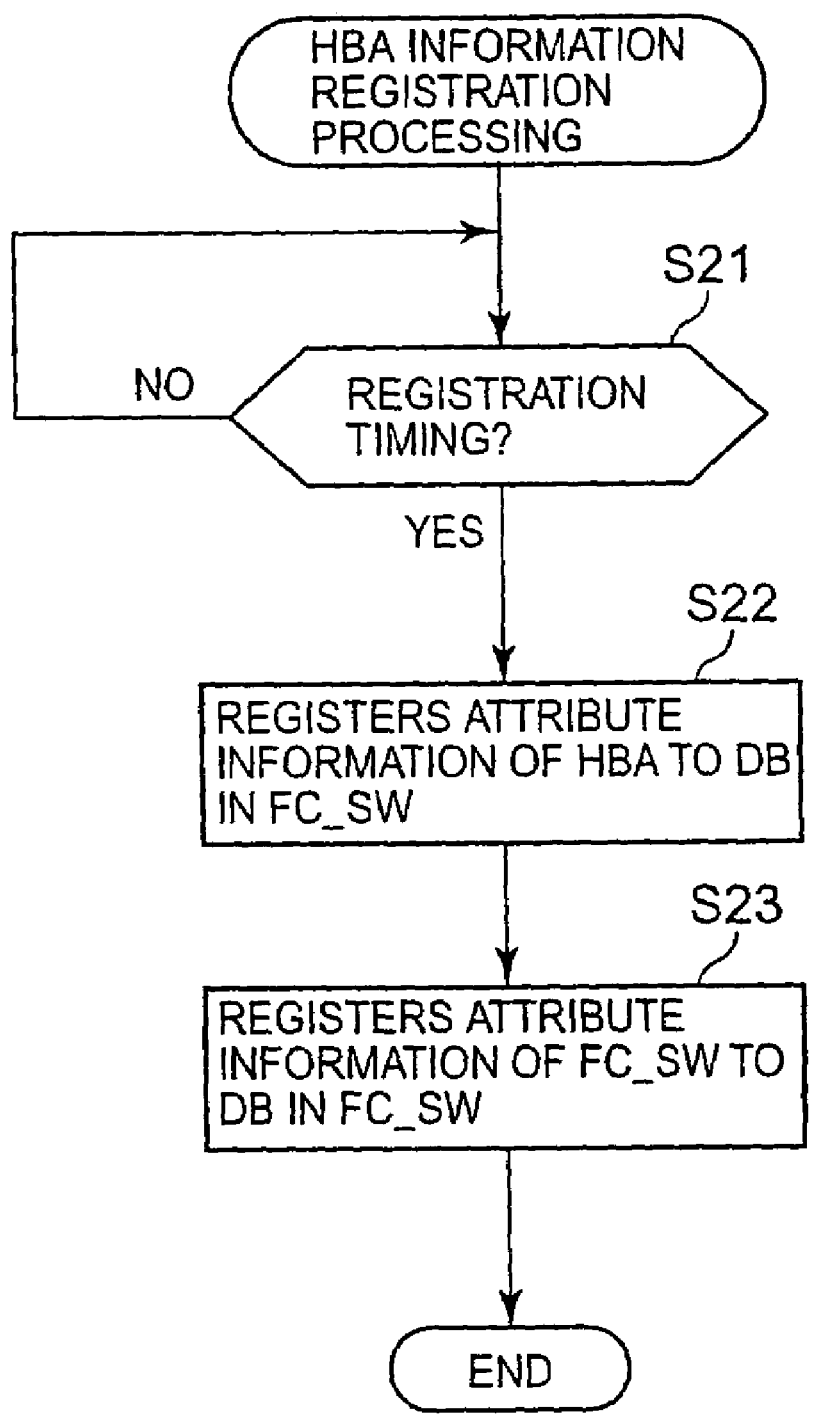
FIG. 10 is a flow chart depicting the HBA information registration processing.

FIG. 10 is a flow chart depicting an outline of the HBA information registration processing. This processing can also be referred to as "connection configuration information registration processing" or "attribute information registration processing".

First the switch 20 judges whether a predetermined timing to register the attribute information has come (S21). There are various predetermined timings to register the attribute information, and an example is a timing when the host 10 and the switch 20 are connected. In this case, if it is set such that the attribute information is collected at the first connection of the host 10 and the switch 20, then the start of collecting each attribute information can be prevented when the cable CN 1, connecting the host 10 and the switch 20, is merely disconnected, so the burden on configuration management can be decreased. If it is set such that a predetermined command is issued at first connection in the setup screen of the driver software of the HBA 11, then the issue of this predetermined command can be used as a trigger to start collecting each attribute information.

When a predetermined registration timing comes (S21: YES), that is when a predetermined command is issued from the HBA 11, for example, the attribute information of the HBA 11 is acquired using FDMI, and is registered in the HBA information data base 26 (S22). The attribute information of the switch 20 is also acquired using FDMI, and is registered in the HBA information data base 26 (S23).

The attribute information acquired from the HBA 11 and the switch 20 respectively are associated with each other and managed by the HBA information data base 26 respectively.

Figure 11:
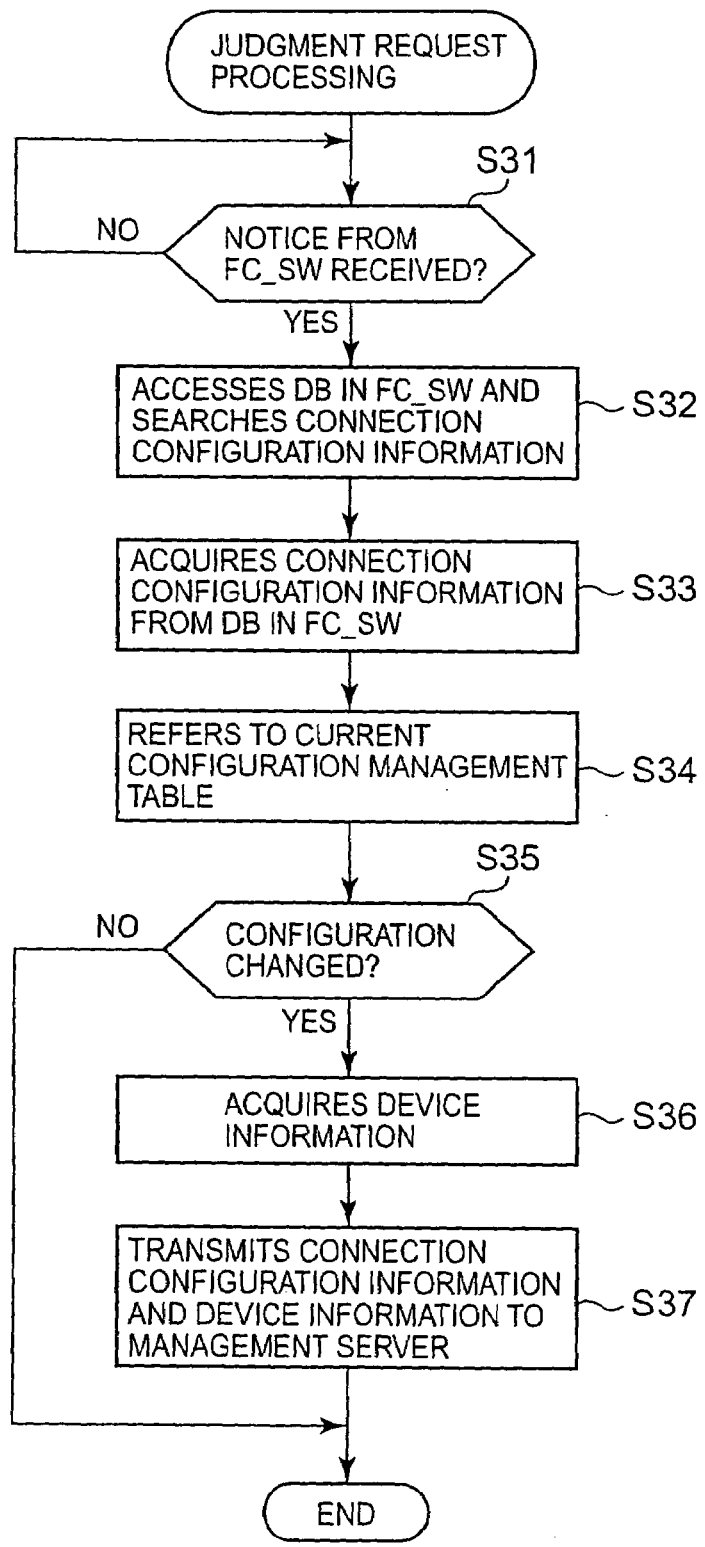
FIG. 11 is a flow chart depicting the judgment request processing.

FIG. 11 is a flow chart depicting an outline of the judgment request processing to be executed by the collection AP 31. First the collection AP 31 judges whether the start timing of the judgment request processing has come (S31). Here it is judged whether the notice from the switch 20 was received, as an example. If the connection configuration information is registered in the HBA information data base 26 of the switch 20, a predetermined notice is sent from the switch 20 to the storage device 100. When this predetermined notice is detected (S31: YES), the collection AP 31 starts this processing.

The collection AP 31 accesses the HBA information data base 26 in the switch 20, and searches the registered connection configuration information (S32). In other words, the collection AP 31 searches the connection configuration information on each port for each CHA 110 (S32), and acquires the connection configuration information from the HBA information data base 26 (S33).

The collection AP 31 refers to the current configuration management table 32 (S34), and compares the connection configuration information acquired from the switch 20 and the content of the current configuration management table 32 (S35). If the connection configuration information acquired in S33 and that in the previous time stored in the current configuration management table 32 are different (S35: YES), the collection AP 31 reads the device information 141 from the shared memory 140 of the storage device 100 (S35). The collection AP 31 corresponds the connection configuration information and the device information 141 and sends it to the management server 40 (S37), and ends this processing.

Whereas if the content of the connection configuration information acquired this time and the latest configuration registered in the current configuration management table 32 match (S35: NO), the collection AP 31 ends this processing.

The device information 141 can include the name and model name of the storage device 100, version information of the firmware and various statuses of the device, for example. The device information can be sent to the management server 40 at a different timing, separate from the connection configuration information, so if the device information has already been transmitted, the management server 40 can execute processing without retransmitting the device information.

Figure 12:
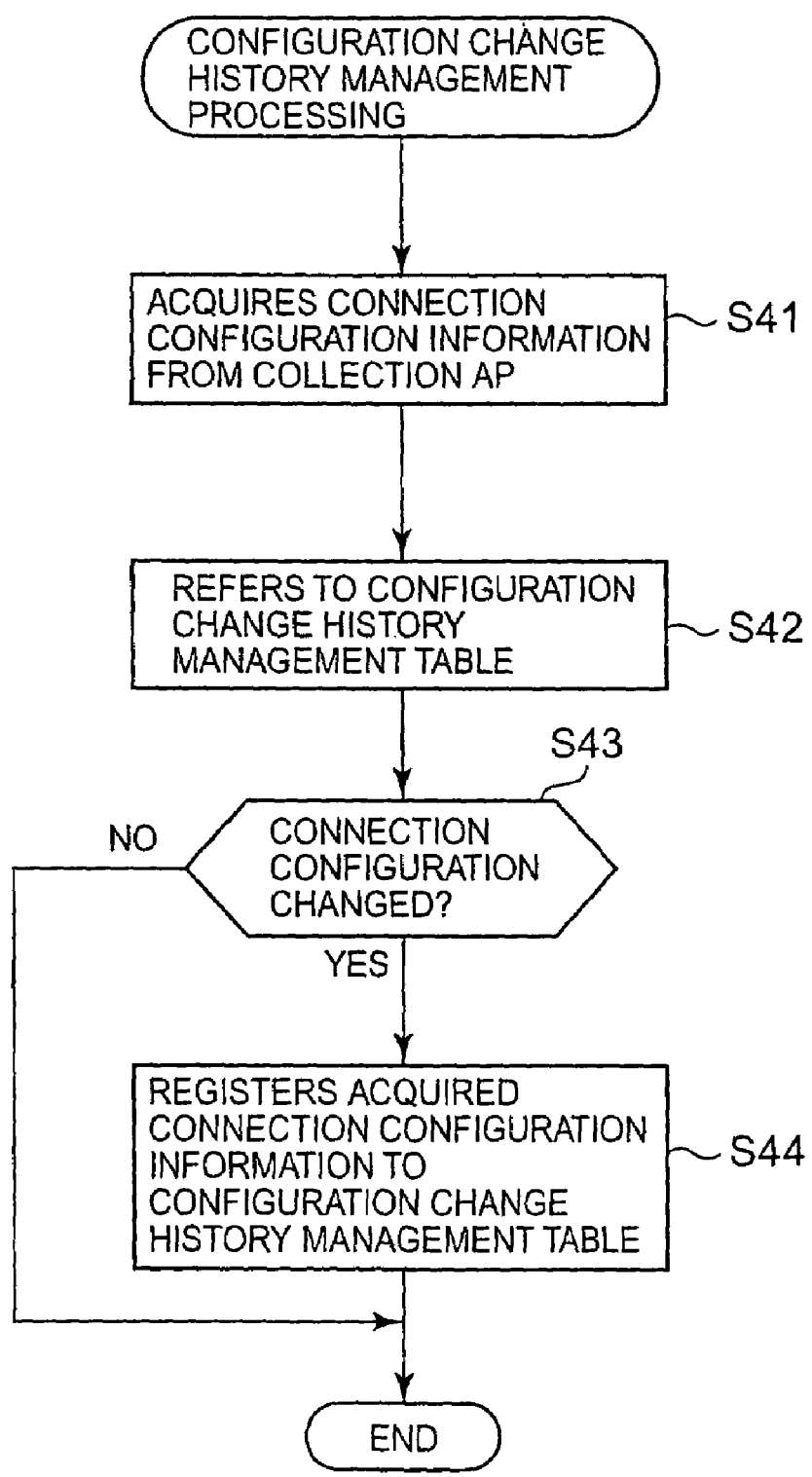
FIG. 12 is a flow chart depicting the configuration change history management processing.

FIG. 12 is a flow chart depicting an outline of the configuration change history management processing to be executed by the management server 40. When the connection configuration information is received from the collection AP 31 of the management terminal 30 (S41), the management server 40 refers to the configuration change history management table T4 (S42).

The management server 40 compares the latest connection configuration registered in the configuration change history management table T4 and the connection configuration information acquired in S41, and judges whether they are different (S43).

If they are different (S43: YES), the management server 40 registers the connection configuration information acquired in S41 in the configuration change history management table T4 (S44). This is because the configuration of the storage system has changed. If they match, on the other hand, (S43: NO), the management server 40 skips S44.

Figure 13:
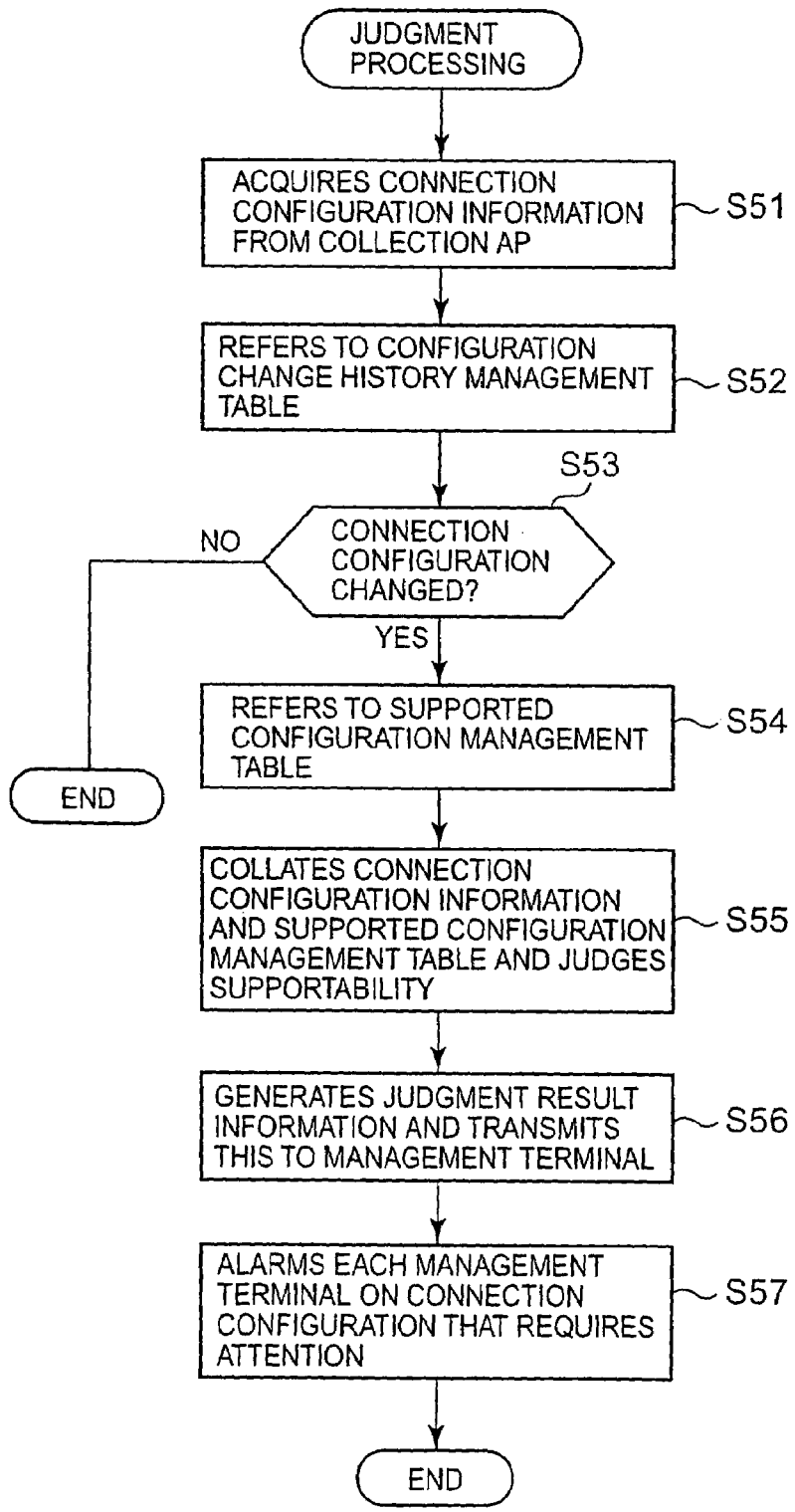
FIG. 13 is a flow chart depicting the judgment processing.

FIG. 13 is a flow chart depicting an outline of the judgment processing to be executed by the management server 40. When the connection configuration information is acquired from the collection AP 31 (S51), the management server 40 refers to the configuration change history management table T4 (S52). The management server 40 judges whether the connection configuration information acquired in S51 and the latest connection configuration information registered in the configuration change history management table T4 are different (S53).

If they match (S53: NO), the management server 40 ends the judgment processing. Whereas if they are different (S53: YES), the management server 40 refers to the supported configuration management table T3 (S54), and judges whether the configuration indicated by the connection configuration information acquired in S51 is supportable (S55).

For example, if the connection configuration indicated by the connection configuration information acquired in S51 is registered in the supported configuration management table T3, it is judged that the normal operation of this connection configuration can be guaranteed and can be supported.

If the connection configuration indicated by the connection configuration information acquired in S51 is substantially similar to the configuration registered in the supported configuration management table T3, this connection configuration can also be judged to operate normally. For example, in the case when only the number of ports of the switch 20 is increased or decreased, the model name of the switch 20 changes, but this in no way affects the configuration for data transfer by FCP. In this case, normal operation can be expected. Even when the driver software of the HBA 11 is updated and the version number is changed, normal operation can be expected if the update is minor, and data transfer by FCP is no way affected.

If the connection configuration indicated by the connection configuration information acquired in S51 is a configuration not registered in the supported configuration management table T3, and there are no similar configurations in this table, then it cannot be judged that this connection configuration will operate normally.

In this way, the management server 40 judges the reliability of the connection configuration information requested by the collection AP 31, generates the information to indicate the judgment result, and sends it to the collection AP 31 (S56).

If a connection configuration which requires attention is detected, the management server 40 sends an alarm to the collection AP 31 of each storage system about this connection configuration which requires attention respectively (S57). For example, if the connection configuration information of which judgment is requested in S51 is expected to be a possible cause of a critical failure, the management server 40 prompts attention on this connection configuration information to each collection AP 31 of each management terminal 30. An alarm from the management server 40 to each collection AP 31 can be performed actively or passively. An active alarm is the case when the information to prompt attention is sent from the management server 40 to each collection AP 31 respectively, for example. A passive alarm is such a case when the connection configuration information which requires caution is held on the management server 40, waiting for access by each collection AP 31.

Figure 14:
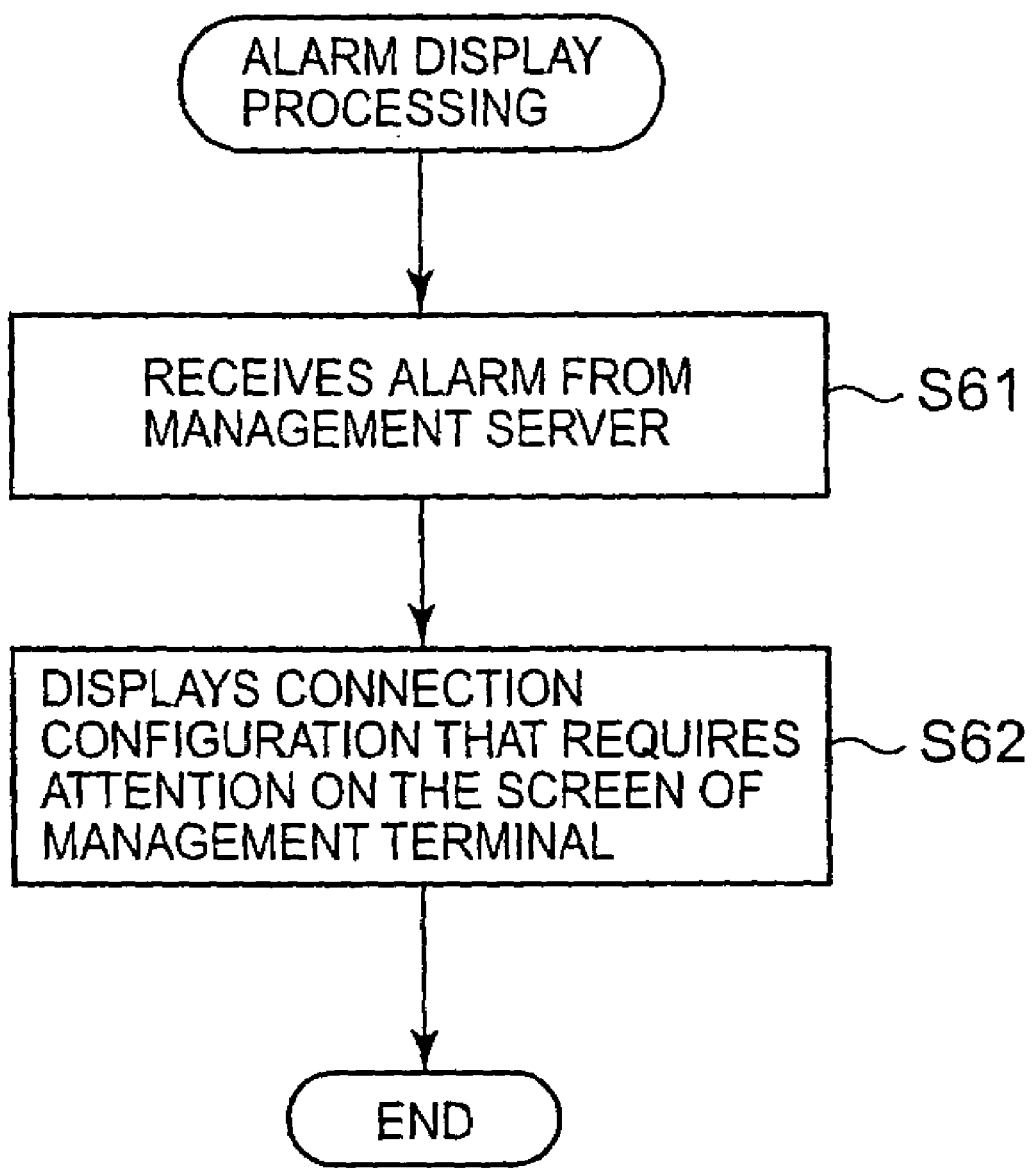
FIG. 14 is a flow chart depicting the alarm display processing.

FIG. 14 is a flow chart depicting an outline of the alarm display processing to be executed by the collection AP 31 of the management terminal 30. When a negative judgment result or an alarm is received from the management server 40 (S61), the collection AP 31 displays this negative judgment result or alarm on the terminal screen of the management terminal 30 (S62).

The user can know the reliability of the storage system before starting actual operation by confirming the information displayed on the screen of the management terminal 30. The user can prevent the occurrence of a failure by further changing the configuration or by returning the status to the original configuration. When the user further changes the configuration to prevent the occurrence of a failure, the connection configuration information to indicate this configuration change is sent from the collection AP 31 to the management server 40 where the reliability thereof is judged. The user can stop the operation of the storage system until a positive judgment result is received.

Figure 15:
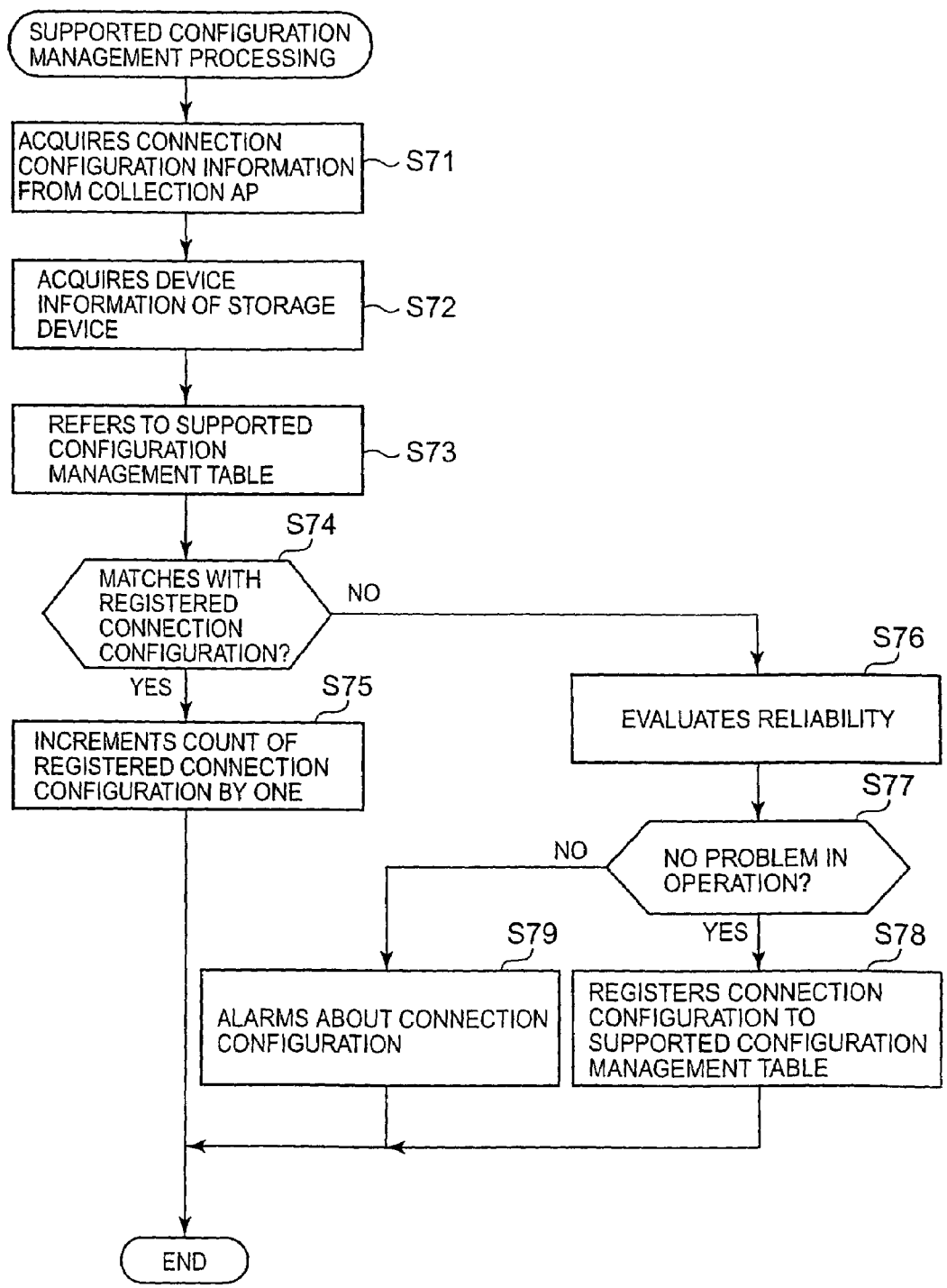
FIG. 15 is a flow chart depicting a supported configuration management processing.

FIG. 15 is a flow chart depicting an outline of the supported configuration management processing to be executed by the management server 40. The management server 40 acquires the connection configuration information and the device information respectively from the collection AP 31 (S71, S72).

The management server 40 refers to the supported configuration management table T3 (S73), and judges whether the connection configuration information matches the connection configuration already registered in this table T3 (S74). If there is a match with the registered connection configuration (S74: YES), the management server 40 increments the count value of the matched entry by one (S75).

If the connection configuration indicated by the connection configuration information acquired in S71 does not match with any of the connection configurations registered in the supported configuration management table T3 (S74: NO), the management server 40 evaluates the reliability on the connection configuration information acquired in S71 (S76).

The management server 40 judges whether the configuration indicated by the connection configuration information acquired in S71 will not affect the operation of the storage system (S77). If it is judged that the connection configuration indicated by this connection configuration information can be supported, this means that the connection configuration does not affect the operation.

If it is judged that the connection configuration information does not affect the operation (S77: YES), the management server 40 registers the connection configuration information acquired in S71 in the supported configuration management table T3 (S78). If it cannot be judged that the connection configuration information does not affect the operation (S77: NO), the management server 40 sends an alarm to the collection AP 31 (S79).

In this way, when a new combination has been operating in an actual storage system before the vendor performs verification, it may be judged that this unverified combination has in practically terms no problems. In this case, the management server 40 registers this new unverified connection configuration (an actual operating configuration) in the supported configuration management table T3, and holds this latest content in the supported configuration management table T3.

The management server 40 can incorporate the operation history in each storage system into the supported configuration management table T3 so as to unitarily manage the configuration changes of a plurality of storage sub-systems, and can generate and maintain the latest content before acquiring a verification result by the vendor.

Figure 16:
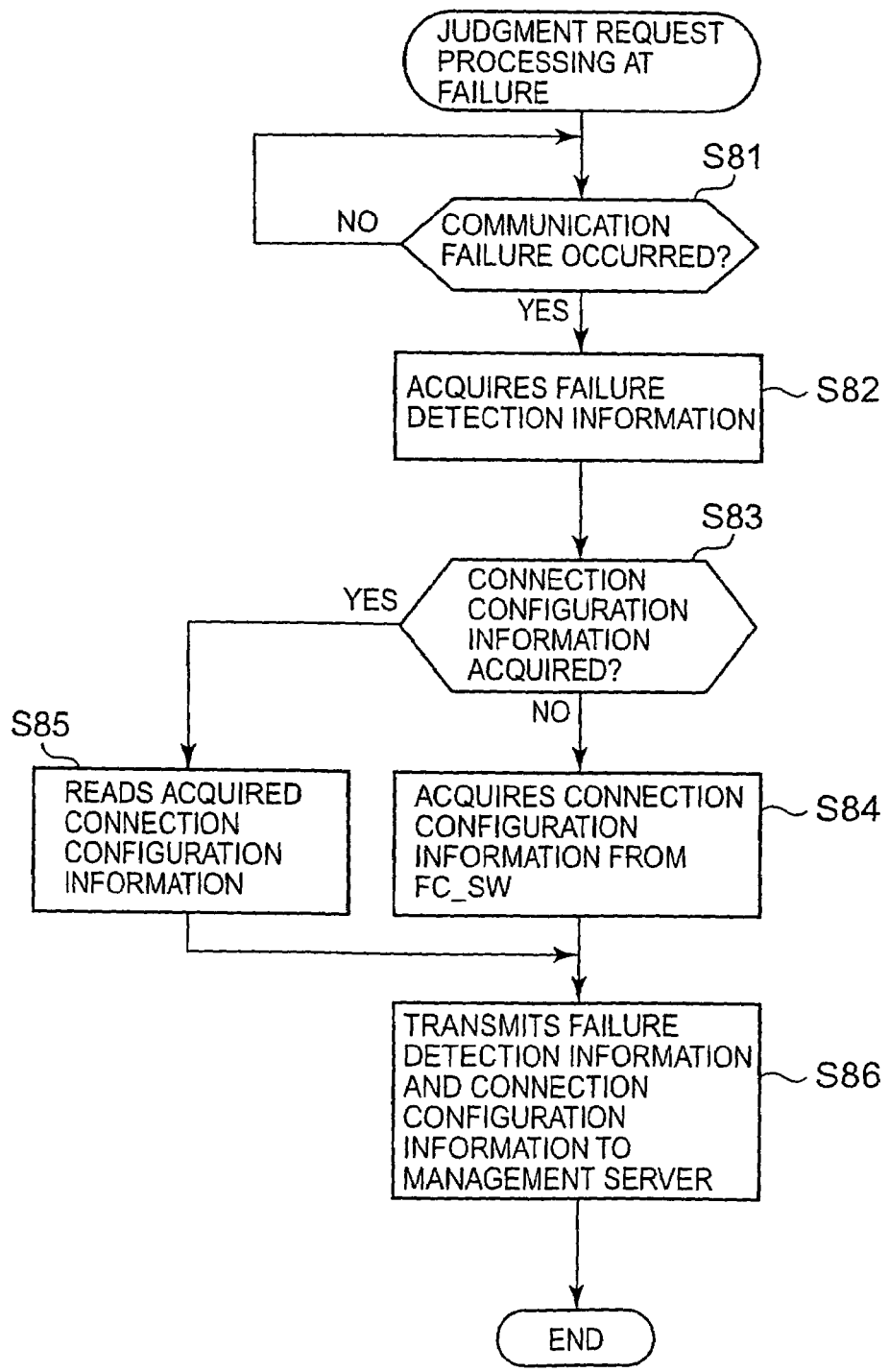
FIG. 16 is a flow chart depicting the judgment request processing when a failure occurs.

FIG. 16 is a flow chart depicting an outline of the judgment request processing when a failure occurs. This processing is executed by the collection AP 31.

Each CHA 110 of the storage device 100 monitors whether the data transfer with the host is being performed normally. When a write command from the host 10 is processed, for example, the CHA 110 stores the write data in the cache memory 130, then reports the completion of writing to the host 10, and request the next write data. If the write data from the host 10 can be received within a predetermined time after this request, no problems occur. If the write data from the host 10 does not reach the CHA 110 after a predetermined time has elapsed, a time out error occurs, and the failure occurrence is detected.

The collection AP 31 acquires the information on the failure via the SVP 170, and generates the failure detection information (S82). This failure detection information can include, for example, the type of failure, date and time of occurrence and content of the failure.

The collection AP 31 judges whether the connection configuration information on the CHA 110 of which the failure was detected has already been acquired (S83). If the connection configuration information on this detected failure has already been acquired (S83: YES), the collection AP 31 reads the acquired connection configuration information (S85). If the connection configuration information on the detected failure has not yet been acquired (S83: NO), the collection AP 31 accesses the HBA information data base 26 of the switch 20 via the SVP 170 and CHA 110, and acquires the connection configuration information (S84).

The collection AP 31 corresponds the failure detection information and the connection configuration information, and transmits it to the management server 40 (S86).

Based on the transmitted failure detection information and connection configuration information, a part of the composing elements of the connection configuration information, which is the cause of the problem, can be estimated using the configuration change history management table T4 and supported configuration management table T3.

Figure 17:
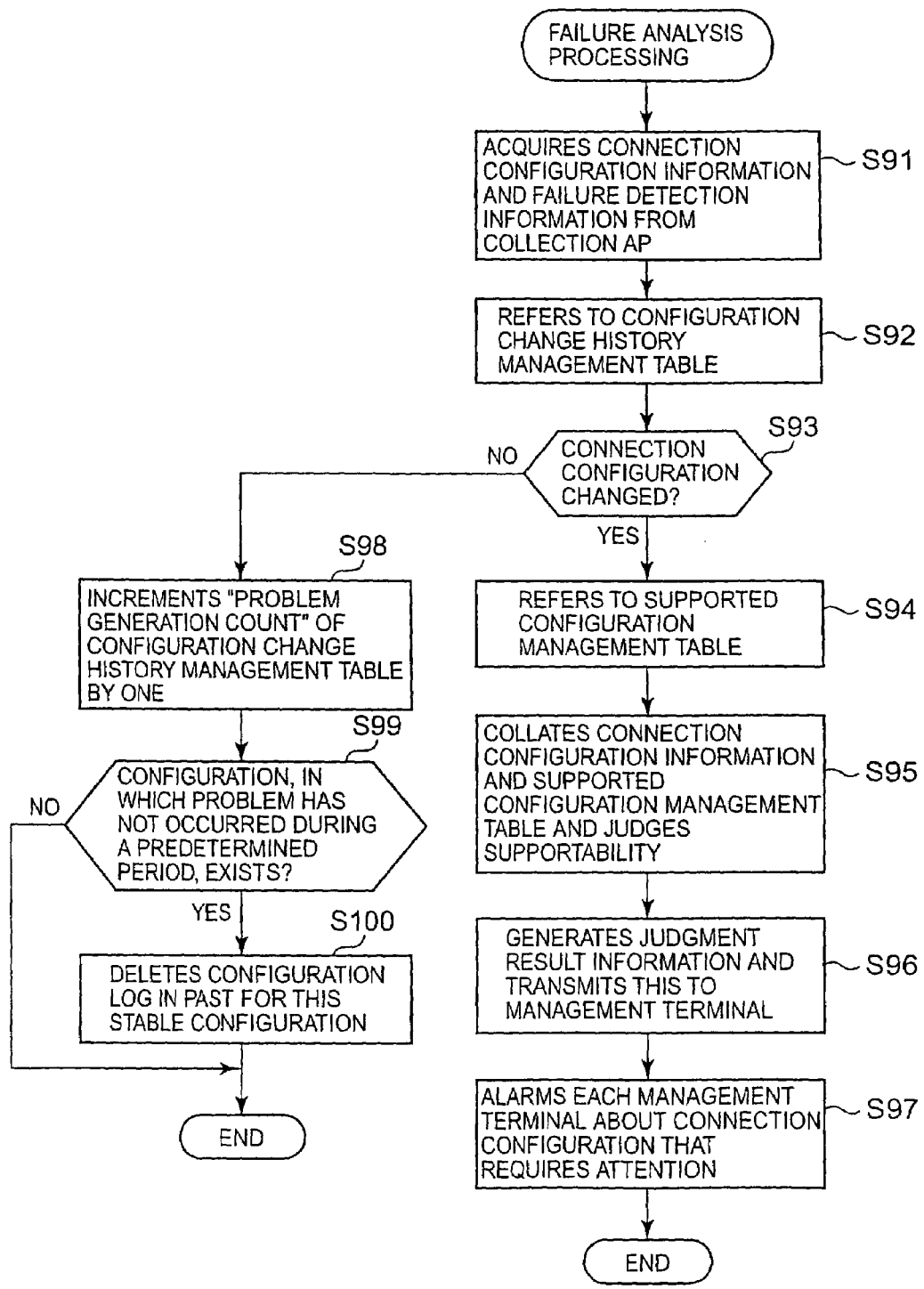
FIG. 17 is a flow chart depicting the failure analysis processing.

FIG. 17 is a flow chart depicting an outline of the failure analysis processing to be executed by the management server 40. When the connection configuration information and failure detection information are received from the collection AP 31 respectively (S91), the management server 40 refers to the configuration change history management table T4 (S92).

The management server 40 judges whether the connection configuration information acquired in S91 is different from the latest information registered in the configuration change history management table T4 (S93). If they match (S93: NO), this means that the failure which occurred in the connection configuration may be caused by something other than the connection.

When the notice on the failure occurrence is received, the management server 40 increments the "problem generation count" of the configuration related to the failure by one in the configuration change history management table T4 (S98). The management server 40 refers to the configuration change history management table T4, and judges whether the storage system which has been operating without problem for a predetermined period exists (S99). In other words, if the value of the problem generation count is "0" for a predetermined period, the history of the storage system in the past is deleted. The latest configuration is held. By this, data unnecessary for failure analysis is deleted, and the limited storage area can be effectively used.

If the connection configuration information acquired in S91 and the latest information registered in the configuration change history management table T4 are different (S93: YES), one possible cause of the occurrence of the failure is the change of the connection configuration. So the management server 40 refers to the supported configuration management table T3 (S94), and judges whether the connection configuration indicated by the connection configuration information related to the failure is supportable (S95).

The management server 40 generates the information to indicate the judgment result, and sends it to the collection AP 31 of the management terminal 30 (S96). If the judgment result is S95 is negative, the management server 40 can send an alarm on the connection configuration information acquired in S91 to the collection AP 31 of each storage system (S97).

Since the present embodiment is structured as above, the following effects are exhibited. According to the present embodiment, the information on the configuration of each storage system is collected to the management server 40 via the storage device 100 and the management terminal 30. Therefore the configuration of each storage system can be unitarily managed by the management server 40, and the latest configuration can be quickly known. Therefore even if a failure occurs, this failure can be handled quickly, and the efficiency of the maintenance operation can be improved.

According to the present embodiment, the management server 40 unitarily manages the information on the supported configuration, and judges the reliability of the configuration change of each storage system respectively. Therefore the information verified by the vendor can be simply stored only in the management server 40, and the operability improves. Also the latest support status can be known merely by accessing the management server 40.

According to the present embodiment, not only the configuration verified by the vendor but also the configuration being operated in each storage system without problems can be registered as a supportable configuration. Therefore the reliability of the configuration change can be evaluated while incorporating the actual operating status in each storage system.

According to the present embodiment, the switch 20 collects the connection configuration information on the configuration change of the storage system, and the management server 40 judges the reliability of this connection configuration information. Therefore before the storage system of which the configuration is changed starts actual operation, the reliability of this connection configuration can be diagnosed at an early stage, and the occurrence of a failure can be decreased.

According to the present embodiment, the history of a configuration change is also unitarily managed by the management server 40, so if a failure occurs to the storage system, the cause of the failure can be easily analyzed, and the efficiency of the maintenance operation improves.

According to the present embodiment, the issue of a predetermined command at the first connection of the host 10 and the switch 20 is used as a timing to collect (register) the connection configuration information. Therefore the start of the collection processing of the connection configuration information can be prevented when a cable is merely disconnected, and the configuration of the storage system can be unitarily managed without causing a large burden on the storage system.

According to the present embodiment, the connection configuration information held by the switch 20 is acquired via the storage device 100. Therefore when a failure occurs, the device information of the storage device 100 and the connection configuration information are associated with each other, and can be sent to the management server 40, and the efficiency of the failure analysis operation can be improved. If the host 10 acquires the connection configuration information in the switch 20 and sends it to the management server 40, the device information in the storage device 100 cannot be easily acquired. Therefore in this case, the management server 40 must acquire the device information by another method, which drops the efficiency of the failure analysis operation. However in the case when such an advantage is not required, the configuration of transferring the connection configuration information to the management server 40 via the host is also included in the scope of the present invention.

The present invention is not limited to the above mentioned embodiments. An expert skilled in this field can perform various additions and changes within the scope of the present invention. For example, the collection AP may be disposed in the SVP of the storage device. A switch was used as an example of the inter-connection device, but the connection configuration information may be collected and held in such a device as a hub.

In the above embodiment, the case when the attribute information of the HBA and the switch, acquired respectively using the FDMI included in a general service (GS-4) of the fiber channel protocol, was described. By this, the configuration change of the storage system can be unitarily managed with a relatively simple configuration. However the present invention is not limited to this, but an interface for transferring attribute information may be installed separately in the HBA and the switch, for example, and the attribute information may be transferred via this special interface.

What is claimed is:

1. A method of evaluating a reliability of a to-be-implemented configuration of a storage system including a storage device and a host connected via an inter-connection device, comprising:
    connecting a management device to said storage device;
    acquiring and holding by said inter-connection device connection configuration information between said storage device and said host;
    requesting by said storage device judgment on a reliability of said connection configuration information;
    managing by said management device evaluated configuration information indicating a plurality of types of connection configuration of which a respective reliability is evaluated; and
    judging by said management device the reliability of said connection configuration information based on said connection configuration information and said evaluated configuration information.

2. The method according to claim 1, further comprising a step of notifying the judgment result by said management device to said storage device.

3. The method according to claim 1, further comprising a step of transmitting by said storage device said acquired connection configuration information to said management device, and a step of requesting by said storage device said management device to judge the reliability when said connection configuration information acquired by said inter-connection device has been changed.

4. The method according to claim 1, further comprising a step of acquiring and holding by said inter-connection device said connection configuration information when said host and said inter-connection device are connected, and a step of acquiring by said storage device said connection configuration information from said inter-connection device in at least one or a plurality of cases among a case when said host and said inter-connection device are connected, a case when said host recognizes said storage device, a case when data is transferred from said host to said storage device, and a case when notice is received from said inter-connection device.

5. The method according to claim 1, further comprising a step of connecting another storage device to said management device, and a step of generating and managing by said management device said evaluated configuration information based on the information collected from said storage device and said other storage device respectively.

6. The method according to claim 1, further comprising a step of managing by said management device said connection configuration information as evaluated configuration information, when it is judged that said connection configuration information for which said storage device requested judgment has a predetermined reliability.

7. The method according to claim 1, further comprising a step of increasing by said management device the reliability of this evaluated configuration information which has already been managed, when said connection configuration information for which said storage device requested judgment has already been managed as said evaluated configuration information.

8. The method according to claim 1, further comprising a step of transmitting by said storage device device information to indicate the internal status of said storage device and said connection configuration information acquired by said inter-connection device to said management device respectively.

9. The method according to claim 1, further comprising a step of transmitting by said storage device failure detection information on a failure to said management device, and a step of analyzing by said management device the failure based on the failure detection information and said connection configuration information, when the failure occurs to data communication between said storage device and said host.

10. The method according to claim 1, further comprising a step of transmitting all or a part of said evaluated configuration information managed by said management device to said storage device.

11. The method according to claim 1, further comprising a step of managing the change history of said connection configuration information, a step of judging the reliability of said connection configuration information requested from said storage device based on said connection configuration information requested from said storage device, said evaluated configuration information managed by said management device and said change history.

12. The method according to claim 1, further comprising a step of sending an alarm on the reliability of the connection configuration information to said storage device, when said management device judges that the reliability of said connection configuration information is at a predetermined low level.

13. The method according to claim 1, wherein said host further comprises a host bus adapter for performing data communication with said storage device according to a fiber channel protocol, and said storage device further comprises a host communication adapter for performing data communication with said host according to said fiber channel protocol, and said inter-connection device acquires and holds said connection configuration information by acquiring the attribute information respectively from said host bus adapter and said host communication adapter using a general service of said fiber channel protocol including the fabric device management interface.

14. The method according to claim 13, further comprising a step of displaying a supported configuration management screen on a screen of the management device.

15. The method according to claim 14, wherein the supported configuration management screen shows a model name of the host bus adapter, version information of a driver soft-ware of the host bus adapter, a type and version of an OS supported by the host bus adapter, a model name of the switch, version information of a firmware of the switch 20, a number of connected switches, an interface type of said storage device, a topology of the interface of said storage device, a topology of the interface of the host bus adapter, a status code and remarks associated with each other respectively in a table format.

16. A method of evaluating a reliability of a to-be-implemented configuration of a storage system including a plurality of storage area networks each including a switch for connecting a host bus adapter of a host and a host communication adapter of a storage device, a management terminal which is directly connected to said storage device, and a management server connected to the management terminal of each of said storage area networks for unitarily managing a configuration of each of said storage area networks, comprising:
    acquiring and holding by the switch of each of said storage area networks connection configuration information between said storage device and said host when said host and a inter-connection device are connected;
    requesting by said management terminal of each of said storage area networks a judgment on the reliability of said connection configuration information acquired by said inter-connection device when change occurred to said acquired connection configuration information;
    managing by said management server evaluated configuration information to indicate a plurality of types of connection configurations of which the reliability is evaluated respectively;
    managing by said management server the change history of said connection configuration information;
    judging by said management server the reliability of said connection configuration information requested from said storage device based on said connection configuration information received from said storage device, said evaluated configuration information managed by said management server, and said change history;
    notifying and displaying by said management server the judgment result to said management terminal; and
    outputting by said management server an alarm on the reliability of the connection configuration information to said storage device when said management server judges that the reliability of said connection configuration information is at a predetermined low level.

17. The method according to claim 16, further comprising a step of displaying a supported configuration management screen on a screen of at least one of the management terminal and said management server.

18. The method according to claim 17, wherein the supported configuration management screen shows a model name of the host bus adapter, version information of a driver software of the host bus adapter, a type and version of an OS supported by the host bus adapter, a model name of the switch, version information of a firmware of the switch 20, a number of connected switches, an interface type of said storage device, a topology of the interface of said storage device, a topology of the interface of the host bus adapter, a status code and remarks associated with each other respectively in a table format.

19. A method of evaluating a reliability of a to-be-implemented configuration of a storage system including a plurality of storage area networks each including a switch for connecting a host bus adapter of a host and a host communication adapter of a storage device, a management terminal which is directly connected to said storage device, and a management server connected to the management terminal of each of said storage area networks for unitarily managing a configuration of each of said storage area networks, comprising:

managing by said management server evaluated configuration information indicating a plurality of types of connection configurations of which the reliability is evaluated respectively;

managing by said management server a change history of connection configuration information between said storage device and said host when said host and a inter-connection device are connected;

judging by said management server a reliability of said connection configuration information requested from said storage device based on said connection configuration information received from said storage device, said evaluated configuration information, and said change history;

notifying and displaying by said management server the judgment result to said management terminal; and outputting by said management server an alarm on the reliability of the connection configuration information to said storage device when said management server judges that the reliability of said connection configuration information is at a predetermined low level.

* * * * *